US009496592B2

United States Patent
Adiletta et al.

(10) Patent No.: US 9,496,592 B2
(45) Date of Patent: Nov. 15, 2016

(54) RACK LEVEL PRE-INSTALLED INTERCONNECT FOR ENABLING CABLELESS SERVER/STORAGE/NETWORKING DEPLOYMENT

(71) Applicants: Matthew J. Adiletta, Bolton, MA (US); Aaron Gorius, Upton, MA (US); (Continued)

(72) Inventors: Matthew J. Adiletta, Bolton, MA (US); Aaron Gorius, Upton, MA (US); (Continued)

(73) Assignee: Intel Corporation, Santa Clara, CA (US)

( * ) Notice: Subject to any disclaimer, the term of this patent is extended or adjusted under 35 U.S.C. 154(b) by 182 days.

(21) Appl. No.: 14/227,497

(22) Filed: Mar. 27, 2014

(65) Prior Publication Data

US 2015/0280827 A1    Oct. 1, 2015

(51) Int. Cl.
*H01P 5/02* (2006.01)
*H01P 3/10* (2006.01)
(Continued)

(52) U.S. Cl.
CPC . *H01P 5/02* (2013.01); *H01P 3/10* (2013.01); *H01P 5/00* (2013.01); *H04B 1/40* (2013.01); (Continued)

(58) Field of Classification Search
CPC ............ H04B 1/40; H04B 10/40; H04B 10/803; H01P 3/10; H01P 5/00; H01P 5/02; H04L 49/40
(Continued)

(56) References Cited

U.S. PATENT DOCUMENTS

2006/0212636 A1  9/2006  Yasuo
2006/0234787 A1  10/2006  Lee et al.
(Continued)

FOREIGN PATENT DOCUMENTS

WO   2015/148124 A1   10/2015
WO   2015/153088 A1   10/2015

OTHER PUBLICATIONS

Cehn, et al., "A 6-Gb/s Wireless Inter-Chip Data Link Using 43-GHz Transceivers and Bond-Wire Antennas", IEEE Journal of Solid-State Circuits, vol. 44, No. 10, Oct. 2009, pp. 2711-2719.
(Continued)

*Primary Examiner* — Robert Pascal
*Assistant Examiner* — Rakesh Patel
(74) *Attorney, Agent, or Firm* — Law Office of R. Alan Burnett, P.S

(57) ABSTRACT

Apparatus and methods for rack level pre-installed interconnect for enabling cableless server, storage, and networking deployment. Plastic cable waveguides are configured to couple millimeter-wave radio frequency (RF) signals between two or more Extremely High Frequency (EHF) transceiver chips, thus supporting millimeter-wave wireless communication links enabling components in the separate chassis to communicate without requiring wire or optical cables between the chassis. Various configurations are disclosed, including multiple configurations for server chassis, storage chassis and arrays, and network/switch chassis. A plurality of plastic cable waveguide may be coupled to applicable support/mounting members, which in turn are mounted to a rack and/or top-of-rack switches. This enables the plastic cable waveguides to be pre-installed at the rack level, and further enables racks to be installed and replaced without requiring further cabling for the supported communication links. The communication links support link bandwidths of up to 6 gigabits per second, and may be aggregated to facilitate multi-lane links.

15 Claims, 42 Drawing Sheets

(71) Applicants: Myles Wilde, Charlestown, MA (US);
Hugh Wilkinson, Newton, MA (US);
Amit Y. Kumar, Hudson, MA (US)

(72) Inventors: Myles Wilde, Charlestown, MA (US);
Hugh Wilkinson, Newton, MA (US);
Amit Y. Kumar, Hudson, MA (US)

(51) Int. Cl.
| | | |
|---|---|---|
| *H01P 5/00* | (2006.01) | |
| *H04B 10/40* | (2013.01) | |
| *H04B 10/80* | (2013.01) | |
| *H04B 1/40* | (2015.01) | |
| *H04B 10/90* | (2013.01) | |
| *H04L 12/931* | (2013.01) | |

(52) U.S. Cl.
CPC ............ *H04B 10/40* (2013.01); *H04B 10/803* (2013.01); *H04B 10/90* (2013.01); *H04L 49/40* (2013.01)

(58) Field of Classification Search
USPC .................................. 333/24 R, 239
See application file for complete search history.

(56) References Cited

U.S. PATENT DOCUMENTS

| | | |
|---|---|---|
| 2007/0115954 A1 | 5/2007 | Wu et al. |
| 2009/0234936 A1 | 9/2009 | Bandholz et al. |
| 2011/0130093 A1 | 6/2011 | Walley et al. |
| 2011/0228779 A1 | 9/2011 | Goergen |
| 2012/0311127 A1 | 12/2012 | Kandula et al. |
| 2013/0017818 A1 | 1/2013 | Rofougaran |
| 2013/0107853 A1 | 5/2013 | Pettus et al. |
| 2013/0191567 A1 | 7/2013 | Rofougaran et al. |
| 2014/0285277 A1* | 9/2014 | Herbsommer ............ H01P 3/16 333/1 |
| 2015/0185425 A1* | 7/2015 | Gundel ................ G02B 6/4292 455/90.2 |
| 2015/0263403 A1* | 9/2015 | Spella ...................... H01P 5/08 343/905 |
| 2015/0288410 A1 | 10/2015 | Adiletta et al. |

OTHER PUBLICATIONS

International Search Report and Written Opinion received for PCT Patent Application No. PCT/US2015/019940, mailed on Jul. 3, 2015, 15 pages.

International Search Report and Written Opinion received for PCT Patent Application No. PCT/US2015/019952, mailed on Aug. 28, 2015, 16 pages.

Office Action received for Taiwan Patent Application No. 104104389, mailed on Jan. 19, 2016, 13 pages of Taiwan Office Action and 1 page of English Search Report.

* cited by examiner

*Fig. 3h*
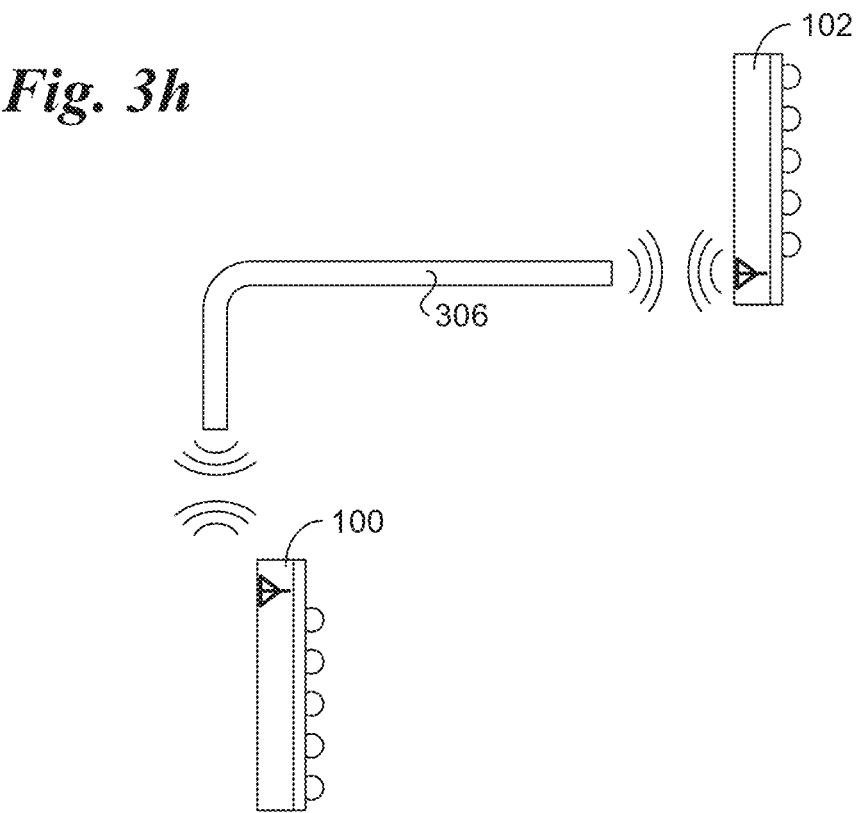
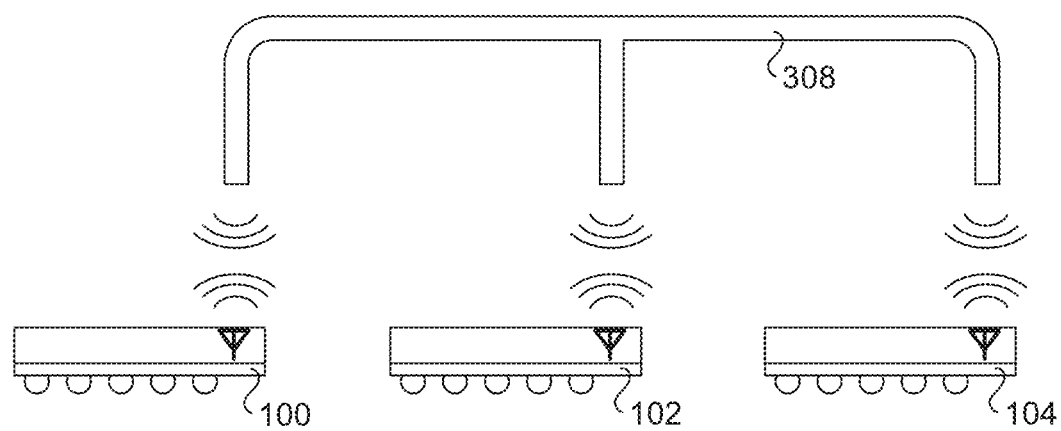
*Fig. 3i*

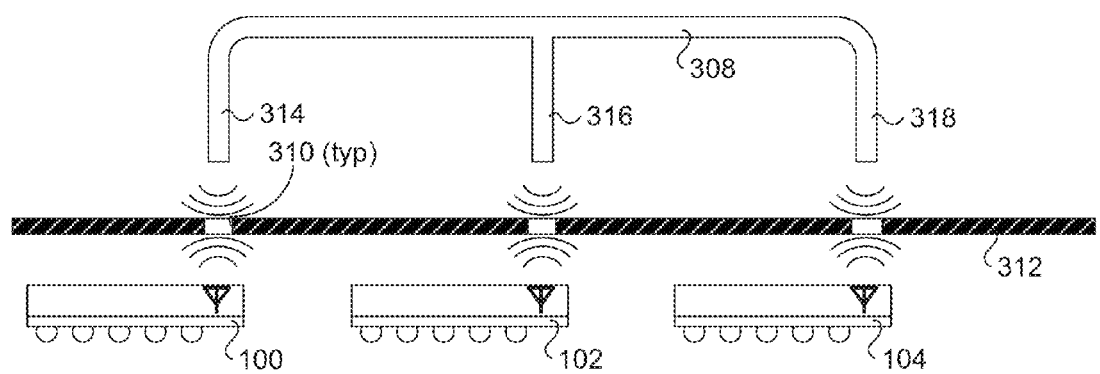
*Fig. 3i-a*
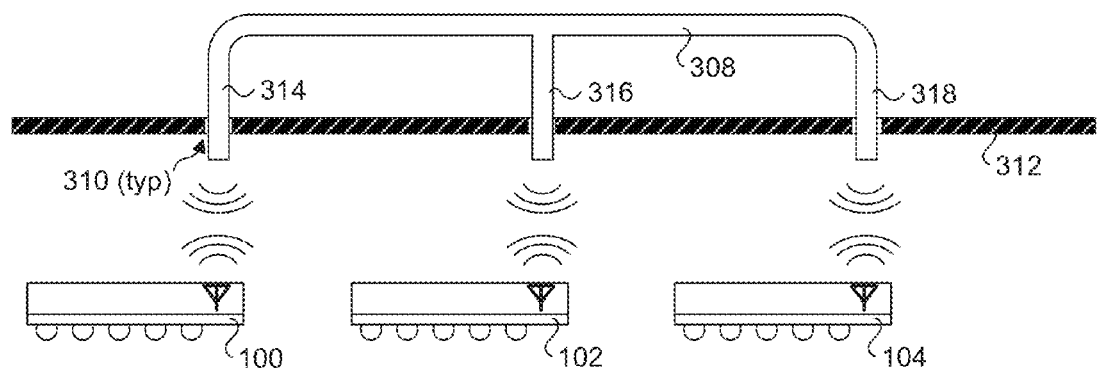
*Fig. 3i-b*

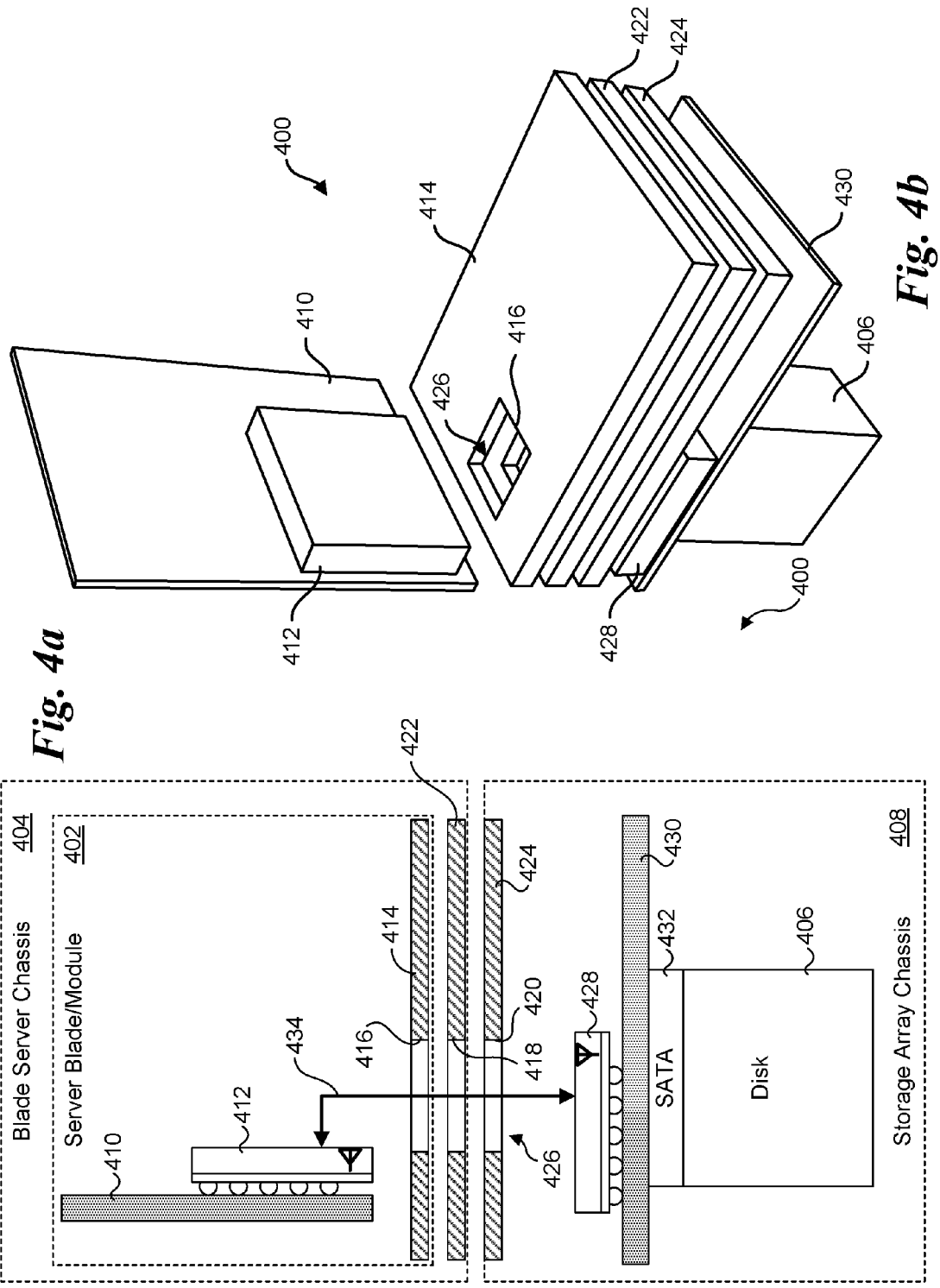

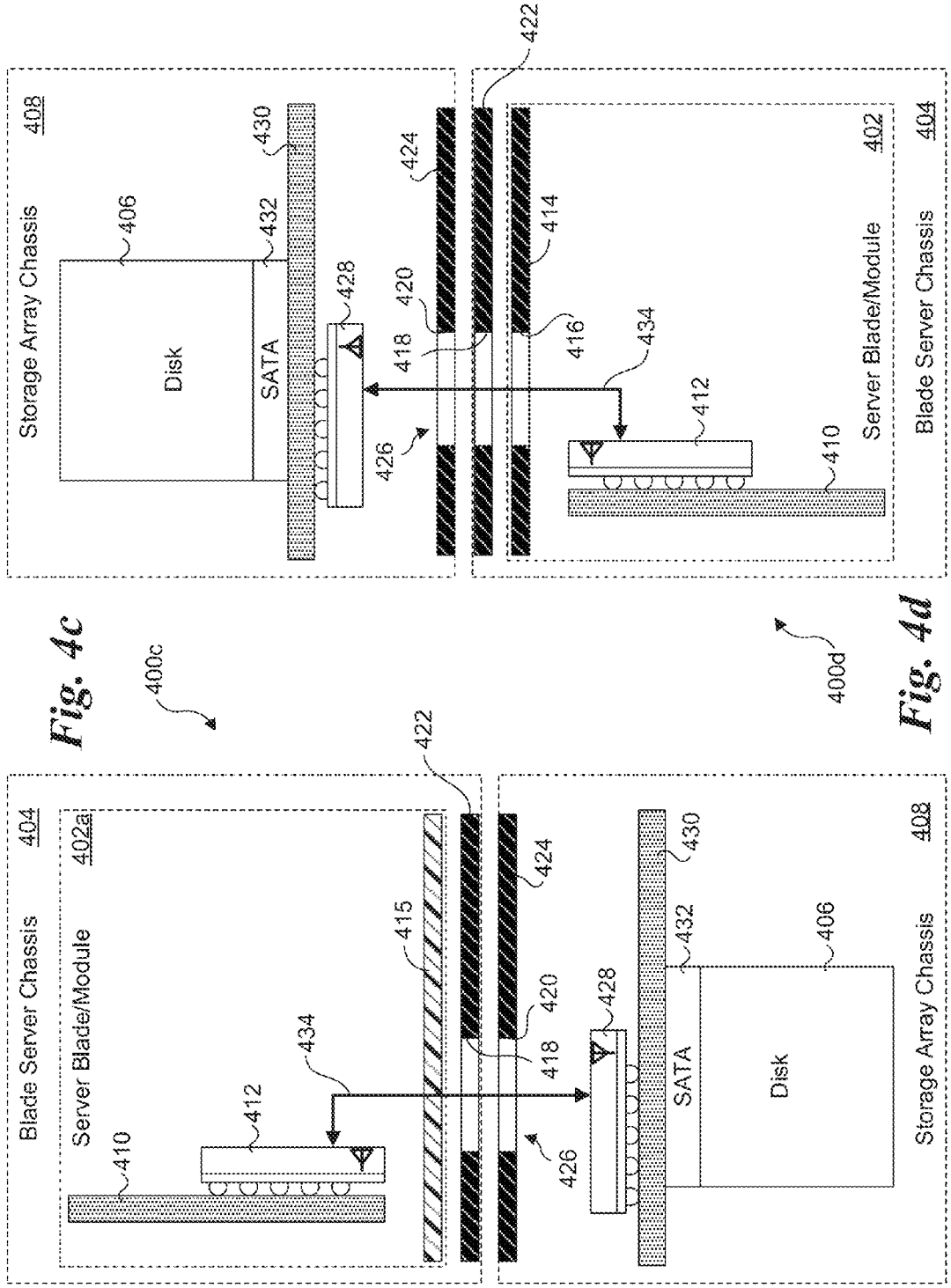

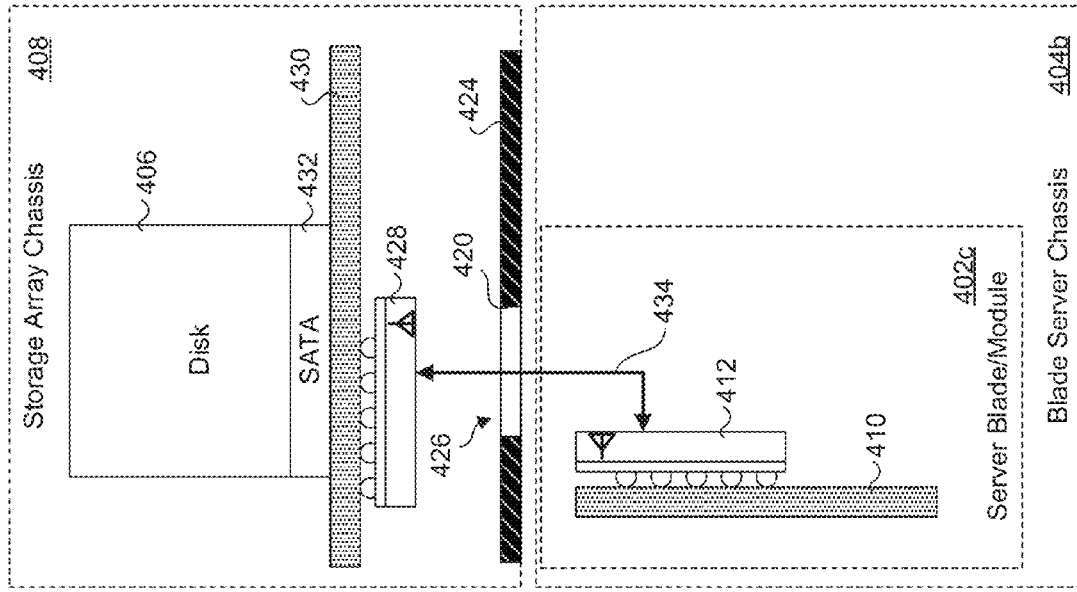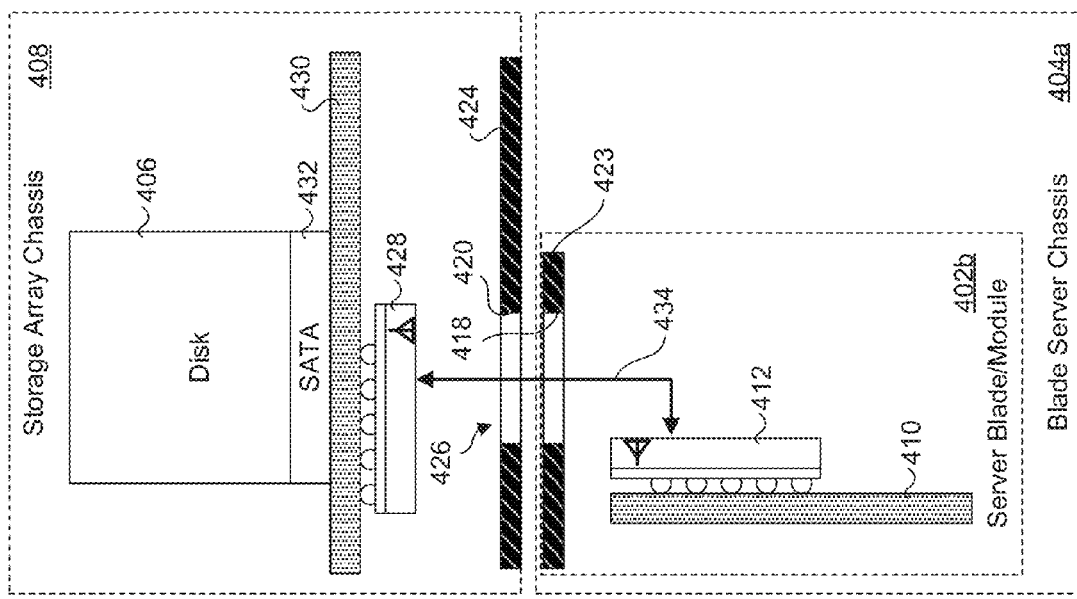

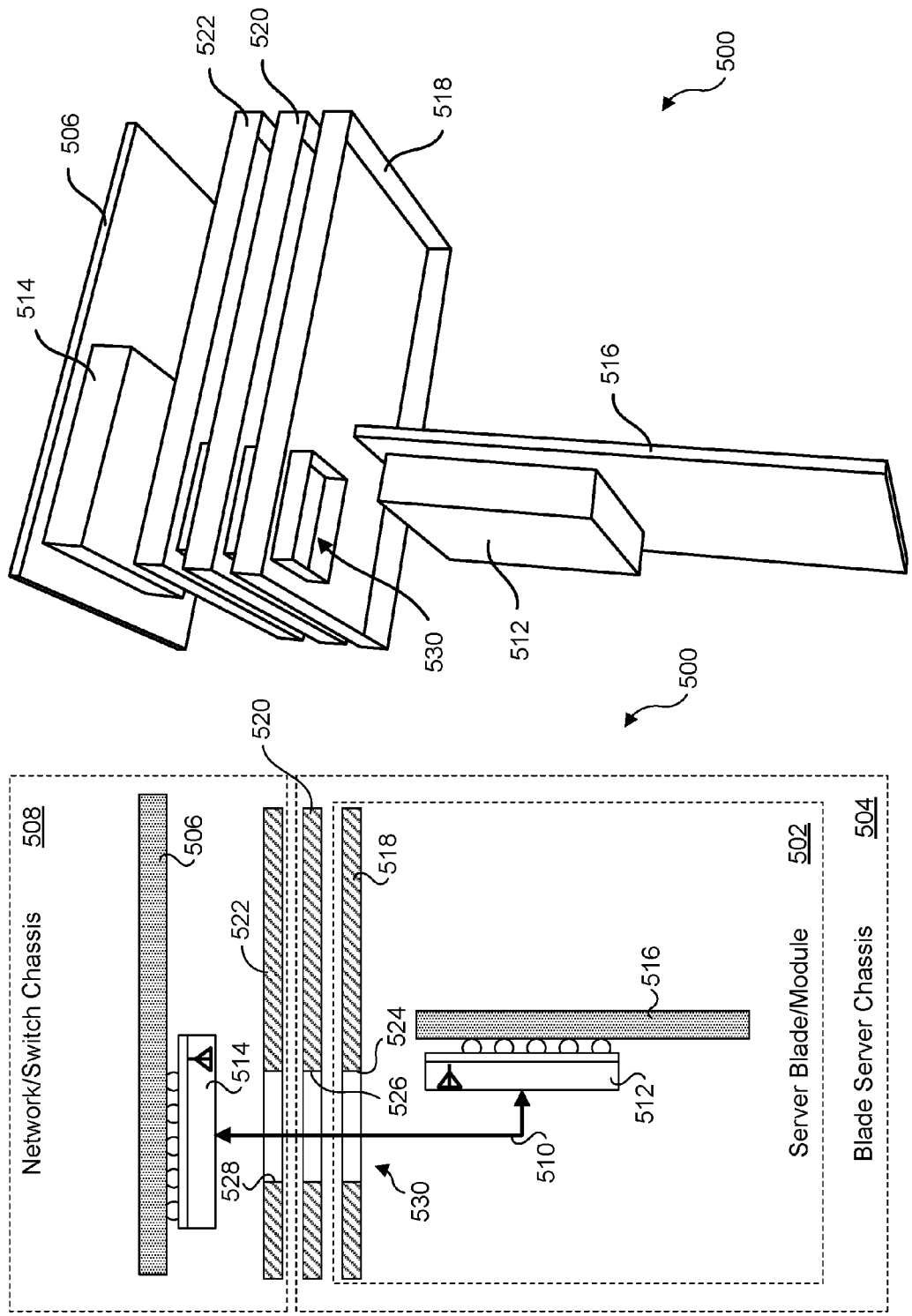

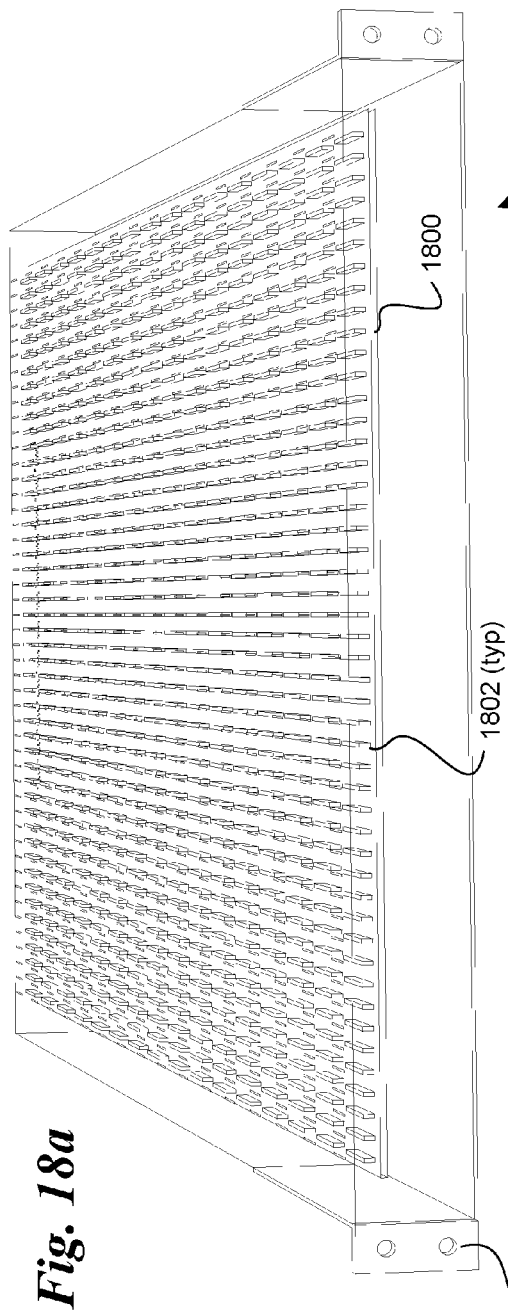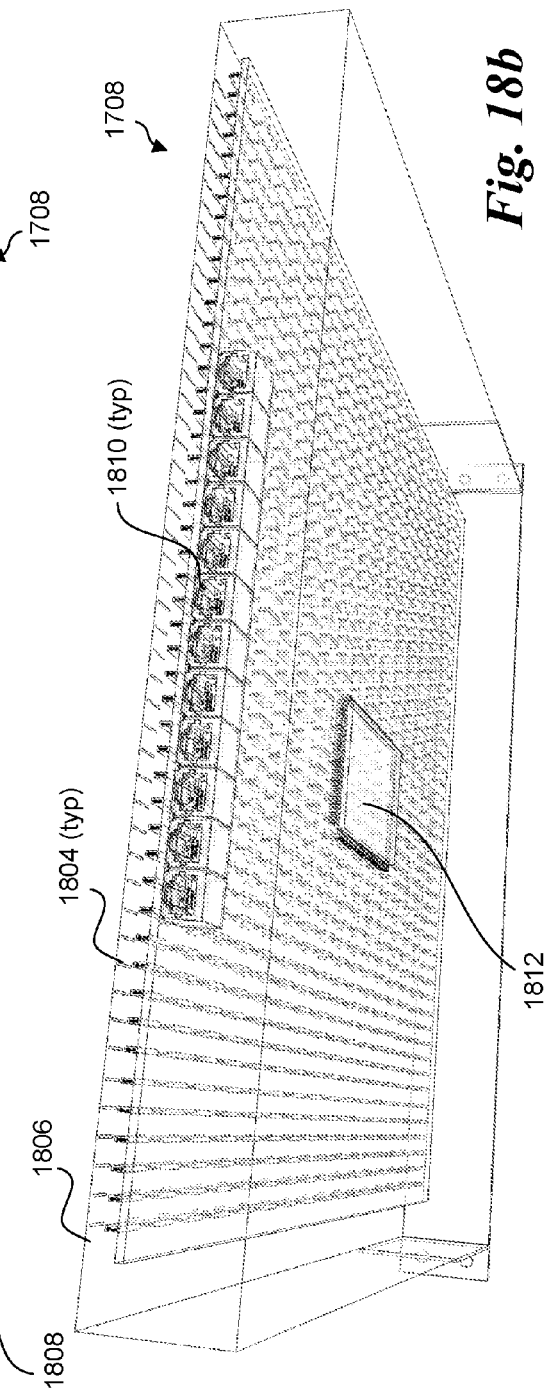

RACK LEVEL PRE-INSTALLED INTERCONNECT FOR ENABLING CABLELESS SERVER/STORAGE/NETWORKING DEPLOYMENT

BACKGROUND INFORMATION

Ever since the introduction of the microprocessor, computer systems have been getting faster and faster. In approximate accordance with Moore's law (based on Intel® Corporation co-founder Gordon Moore's 1965 publication predicting the number of transistors on integrated circuits to double every two years), the speed increase has shot upward at a fairly even rate for nearly three decades. At the same time, the size of both memory and non-volatile storage has also steadily increased, such that many of today's personal computers are more powerful than supercomputers from just 10-15 years ago. In addition, the speed of network communications has likewise seen astronomical increases.

Increases in processor speeds, memory, storage, and network bandwidth technologies have resulted in the build-out and deployment of networks with ever increasing capacities. More recently, the introduction of cloud-based services, such as those provided by Amazon (e.g., Amazon Elastic Compute Cloud (EC2) and Simple Storage Service (S3)) and Microsoft (e.g., Azure and Office 365) has resulted in additional network build-out for public network infrastructure, in addition to the deployment of massive data centers to support these services that employ private network infrastructure.

Cloud-based services are typically facilitated by a large number of interconnected high-speed servers, with host facilities commonly referred to as server "farms" or data centers. These server farms and data centers typically comprise a large-to-massive array of rack and/or blade servers housed in specially-designed facilities. Many of the larger cloud-based services are hosted via multiple data centers that are distributed across a geographical area, or even globally. For example, Microsoft Azure has multiple very large data centers in each of the United States, Europe, and Asia. Amazon employs co-located and separate data centers for hosting its EC2 and AWS services, including over a dozen AWS data centers in the US alone.

In order for the various server blades and modules to communicate with one another and to data storage, an extensive amount of cabling is used. Installing the cabling is very time-consuming and prone to error. In addition, the cost of the cables and connectors themselves are significant. For example, a 3-foot SAS (Serial attached SCSI) cable may cost $45 alone. Multiply this by thousands of cables and installations, and the costs add up quickly, as does the likelihood of cabling errors.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIGS. 3a-3d illustrate launch orientations between pairs of EHF transceiver chips, wherein FIG. 3a depicts a vertical launch, FIG. 3b depicts an offset vertical launch, FIG. 3c depicts a side launch, and FIG. 3d depicts a diagonal launch;

FIGS. 3e-3h illustrate various communication link configurations between EHF transceiver chips having their signals coupled via plastic cable waveguides, wherein FIG. 3e depicts two EHF transceiver chips in the same orientation, and FIGS. 3f-3h depict pairs of EHF transceiver chips oriented 90° apart;

FIG. 3i depicts three EHF transceiver chips in the same orientation having signals coupled to respective legs of a plastic cable waveguide;

FIG. 3i-a illustrates the configuration shown in FIG. 3i further including a sheet metal plate with holes through which the signals are passed;

FIG. 3i-b illustrates the configuration shown in FIG. 3i further including a sheet metal plate with holes through which the legs of the plastic cable waveguide extend;

FIGS. 4a and 4b illustrate a millimeter-wave wireless link between respective EHF transceiver chips in a blade server chassis above a storage array chassis under which signals are passed through holes in three metal layers, according to one embodiment;

FIG. 4c illustrates a millimeter-wave wireless link between respective EHF transceiver chips in a blade server chassis above a storage array chassis under which signals are passed through holes in one plastic layer and two metal layers, according to one embodiment;

FIG. 4d illustrates a millimeter-wave wireless link between respective EHF transceiver chips in a storage array chassis above a blade server chassis under which signals are passed through holes in three metal layers, according to one embodiment;

FIG. 4e illustrates a millimeter-wave wireless link between respective EHF transceiver chips in a storage array chassis above a blade server chassis under which signals are passed through holes in two metal layers, according to one embodiment;

FIG. 4f illustrates a millimeter-wave wireless link between respective EHF transceiver chips in a storage array chassis above a blade server chassis under which signals are passed through a hole in one metal layer, according to one embodiment;

FIGS. 5a and 5b illustrate a millimeter-wave wireless link between respective EHF transceiver chips in a network/switch chassis above a blade server chassis under which signals are passed through holes in three metal layers, according to one embodiment;

FIGS. 18a and 18b show further details of a top-of-rack switch and pre-installed interconnect configuration illustrated in FIGS. 17a-17c, 17e, and 17f, according to one embodiment;

DETAILED DESCRIPTION

Figure 1:
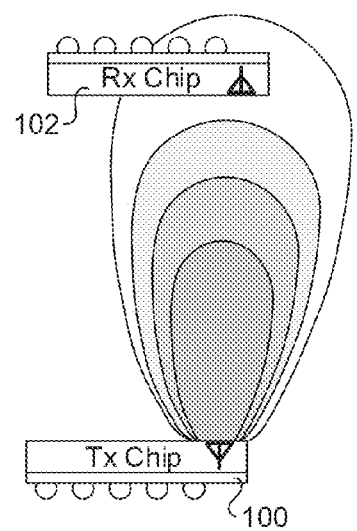
FIG. 1 illustrates a radio frequency antenna output emitted from a transmitter EHF transceiver chip and being received by a receiver EHF transceiver chip.

Embodiments of apparatus and methods for rack level pre-installed interconnect for enabling cableless server, storage, and networking deployment are described herein. In the following description, numerous specific details are set forth to provide a thorough understanding of embodiments described and illustrated herein. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments disclosed herein, Extremely High Frequency (EHF) wireless communication links are used in place of conventional cabling techniques, resulting in reductions in both system component costs and labor costs. The Extremely High Frequency range is approximately 10 GHz-300 GHz. The embodiments leverage recent advancements in very short length millimeter-wave wireless transceiver chips to facilitate contactless communication links for blade server and other high-density module configurations applicable for data centers and the like. As used herein, the terminology "millimeter-wave" means the wavelength of the radio frequency signals is on the order of a millimeter, which may include RF signals with sub-millimeter length within the EHF range. Additionally, the embodiments facilitate use of existing and future server blade and server module configurations.

FIG. 1 illustrates radio frequency (RF) signal energy being output by an antenna in a first EHF transceiver chip 100 operating as a transmitter (Tx or TX) and being received by a second EHF transceiver chip 102 that is operating as a receiver (Rx or RX). As illustrated by the darker shading representing higher energy density, the electromagnetic field strength of the RF signal dissipates with distance from the transmitter.

In one embodiment, each of EHF chips 100 and 102 comprise EHF chips manufactures by WaveConnex, Inc., Mountainview, Calif. In one embodiment, the EHF chips illustrated in the Figures herein comprise a WaveConnex WCX102 (or WCX102b) transceiver chip. Details of the structure and operations of the millimeter-wave technology implemented in the WaveConnex chips are disclosed in U.S. Pat. No. 8,554,136 entitled "TIGHTLY-COUPLED NEAR-FIELD COMMUNICATION-LINK CONNECTOR-REPLACEMENT CHIPS," and U.S. application Ser. No. 13/471,052 (U.S. Pub. No. 2012/0286049 A1) and Ser. No. 13/471,058 (U.S. Pub. No. 2012/0290760 A1), both entitled "SCALABLE HIGH-BANDWIDTH CONNECTIVITY."

Figure 2:
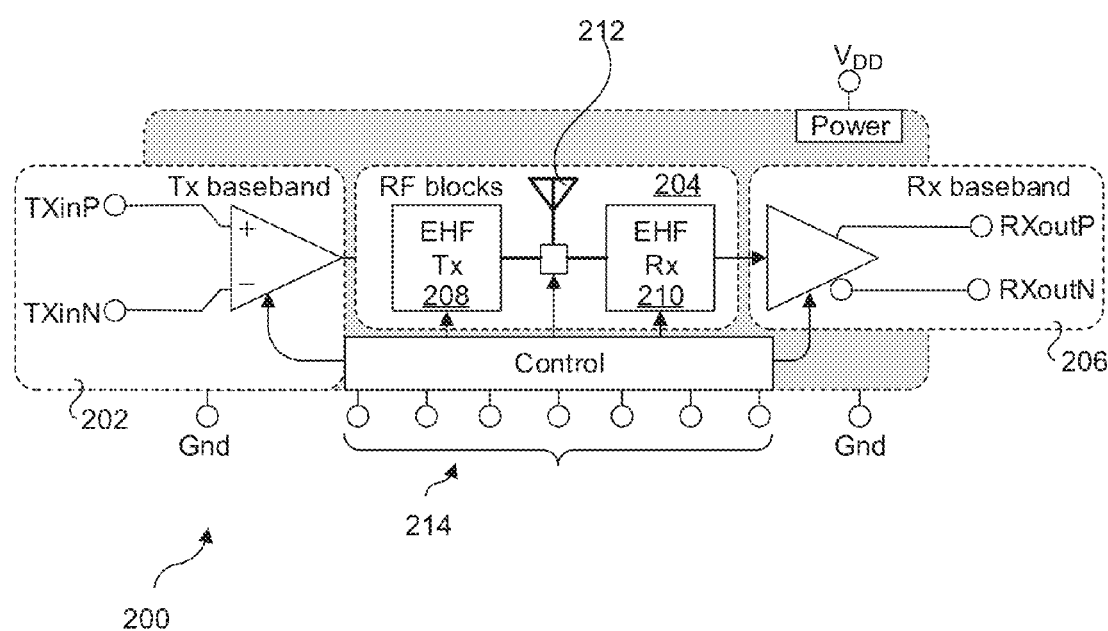
FIG. 2 is a block diagram of one embodiment of an EHF transceiver chip.

FIG. 2 shows a block diagram 200 of an embodiment of an EHF transceiver chip. The basic chip blocks includes a Tx baseband block 202, RF blocks 204, and an Rx baseband block 206. The RF blocks include an EHF transmitter block 208, an EHF receiver block 210, and an antenna 212. The EHF chip is configured to receive a stream of data to be transmitted from an external component using a differential signal at pins TXinP (positive) and TXinN (negative). The input transmitted digital stream is processed by Tx baseband block 202 and EHF transmitter block 208 to create a modulated RF signal that is radiated output from antenna 212. Antenna 212 also receives signals transmitted from a paired EHF transceiver of similar configuration (not) shown, with the received signals processed by EHF receiver block 210 and Rx baseband block 206 to generate a received bitstream encoded using differential signaling that is output at the RXoutP and RXoutN pins. In one embodiment, the EHF transceiver chip employs a 60 GHz carrier that is generated on-chip, with the modulated signal sent to antenna 212 for transmission.

The EHF transceiver chip includes multiple control inputs 214 that are used for various control and configuration purposes. The control inputs enable the transceiver chip to be configured in two operating modes, including a high-speed mode, intended for use with DC balanced differential signals that is suitable for signals running from 100 Mb/s to 6.0 Gb/s and features support for envelope-based Out-of-Band (OOB) signaling used in Serial-Attached-SCSI (SAS) and Serial Advanced Technology Attachment (SATA), as well as electrical idle and Low Frequency Periodic Signaling (LFPS) signals in Peripheral Component Interconnect Express (PCIe) and Universal Serial Bus version 3.0 (USB 3.0).

Figure 3A:
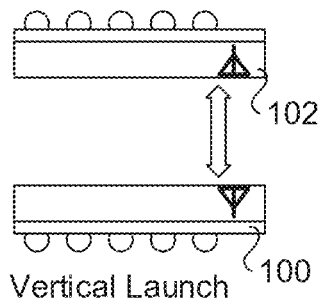
Figure 3B:
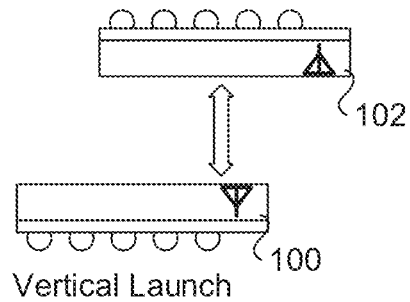
Figure 3C:
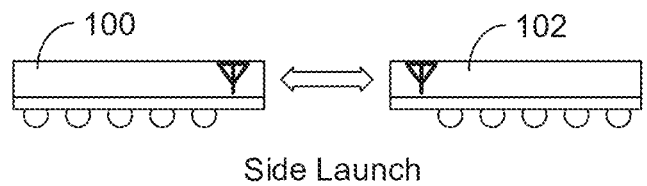
Figure 3D:
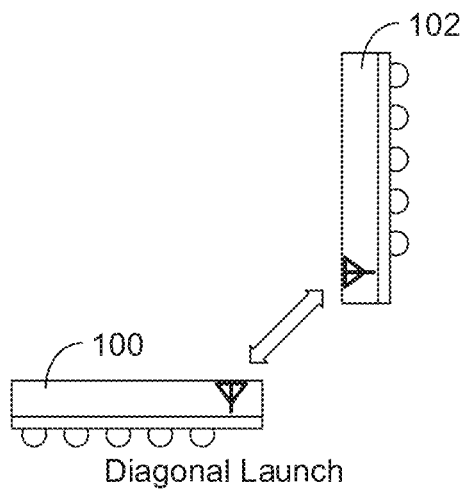

The EHF transceiver chips are configured to facilitate very short range wireless communication links between pairs of transceiver chips in various orientations. For example, a pair of chips may be configured with the top surfaces opposite one another as shown by the vertical launch configuration of FIG. 3a. As shown in FIG. 3b, the antennas of a pair of EHF transceiver chips do not need to be in alignment. FIG. 3c shows a configuration under which a pair of EHF transceiver chips 100 and 102 are in substantially the same plane. In addition to this configuration, a pair of EHF transceiver chips can be in respective parallel planes that are closely spaced (e.g., within a 5-15 millimeters). As shown in FIG. 3d, a diagonal launch configuration is also supported.

In accordance with further aspects of some embodiments, EHF transceiver chips are configured to support a plurality of very short length millimeter-wave wireless links between circuitry and components in physically separate enclosures, such as chassis employed in standard 19" racks. By way of example and without limitation, a configuration 400 is shown in FIGS. 4a and 4b under which circuitry on a server blade 402 in a blade server chassis 404 is linked in communication with a disk drive 406 in a storage array chassis 408. In further detail, server blade 402 includes a main board 410 to which an EHF transceiver chip 412 is mounted. As an option, an EHF transceiver chip may be mounted to a daughter board or otherwise comprise part of a multi-board module. In the illustrated embodiment of FIG. 4a, server blade 402 is either mounted within an enclosure including a cover plate 414 or is coupled to the cover plate 414 in which a hole 416 is formed. Similarly-sized holes 418 and 420 are respectively formed in the sheet metal baseplate 422 of blade server chassis 404 an in a top plate 424 of storage array 408. Preferably, holes 416, 418, and 420 are substantially aligned to form an open pathway 426 through cover plate 414, baseplate 422 and top plate 424, enabling transmission of RF energy between EHF transceiver chip 412 and an EHF transceiver 428 mounted to a backplane 430 in storage array chassis 408. Baseplate 430 includes a plurality of Serial ATA (SATA) connectors 432 to which disk drive 406 is connected.

In one embodiment, EHF transceiver chip 428 is configured to perform signaling to support a SATA interface to facilitate communication between disk drive 406 and the EHF transceiver chip using the SATA protocol. Accordingly, configuration 400 enables circuitry on server blade 410 to write data to and read data from a disk drive 406 in a separate chassis via an EHF millimeter-wave bi-directional wireless link 434. As a result, configuration 400 removes the need for use of physical cabling between blade server chassis 404 and storage array chassis 408.

Exemplary variations of configuration 400 are shown in FIGS. 4c, 4d, 4e, and 4f. Under a configuration 400c of FIG. 4c, a server blade 402a is mounted within an enclosure including a plastic cover plate 415 or otherwise cover plate 415 is attached to main board 410. Unlike metals, which generally attenuate RF signals in the EHF frequency range, various plastics may be employed that provide substantially insignificant attenuation. Accordingly, there is no hole formed in cover plate 415 in the illustrated embodiment. Alternatively, a hole could be formed in cover plate 415 depending on the attenuation of the cover plate material in the EHF frequency range.

Under configurations 400d, 400e and 400f of respective FIGS. 4d, 4e, and 4f, the storage array chassis 408 is placed above blade server chassis 404, and the rest of the components are generally flipped vertically. Configuration 400d is similar to configuration 400, and includes the passing of EHF millimeter-wave bi-directional wireless link 434 via an open pathway formed by holes 416, 418, and 420 through cover plate 414, baseplate 422 and top plate 424.

Under some blade server chassis configuration, blade servers or server modules are inserted vertically and may be "hot-swapped" without having to power down the entire chassis. In addition, there are similar blade server chassis configurations under which the chassis does not include a top or cover plate, since this would need to be removed to remove or install server blades or modules. Such a configuration 400e is shown in FIG. 4e, wherein blade server chassis 404a does not include a cover plate. In this instance, RF signals to facilitate EHF millimeter-wave bi-directional wireless link 434 only need to pass through two metal sheets corresponding to base plate 424 of storage array chassis 408 and a cover plate 423 of a server blade 402b. The also reduces the distance between EHF transceiver chips 412 and 428.

Under configuration 400f shown in FIG. 4f, the RF signals only need to pass through a single metal sheet corresponding to the base plate 424 of storage array chassis 408. In this configuration, a blade server 402c does not include a cover plate. Optionally, the server blade or module could include a plastic cover plate (not shown) through which a hole may or may not be formed. As with blade server chassis 404a in FIG. 4e, blade server chassis 404b does not include a cover plate.

Figures 5C, 5D:
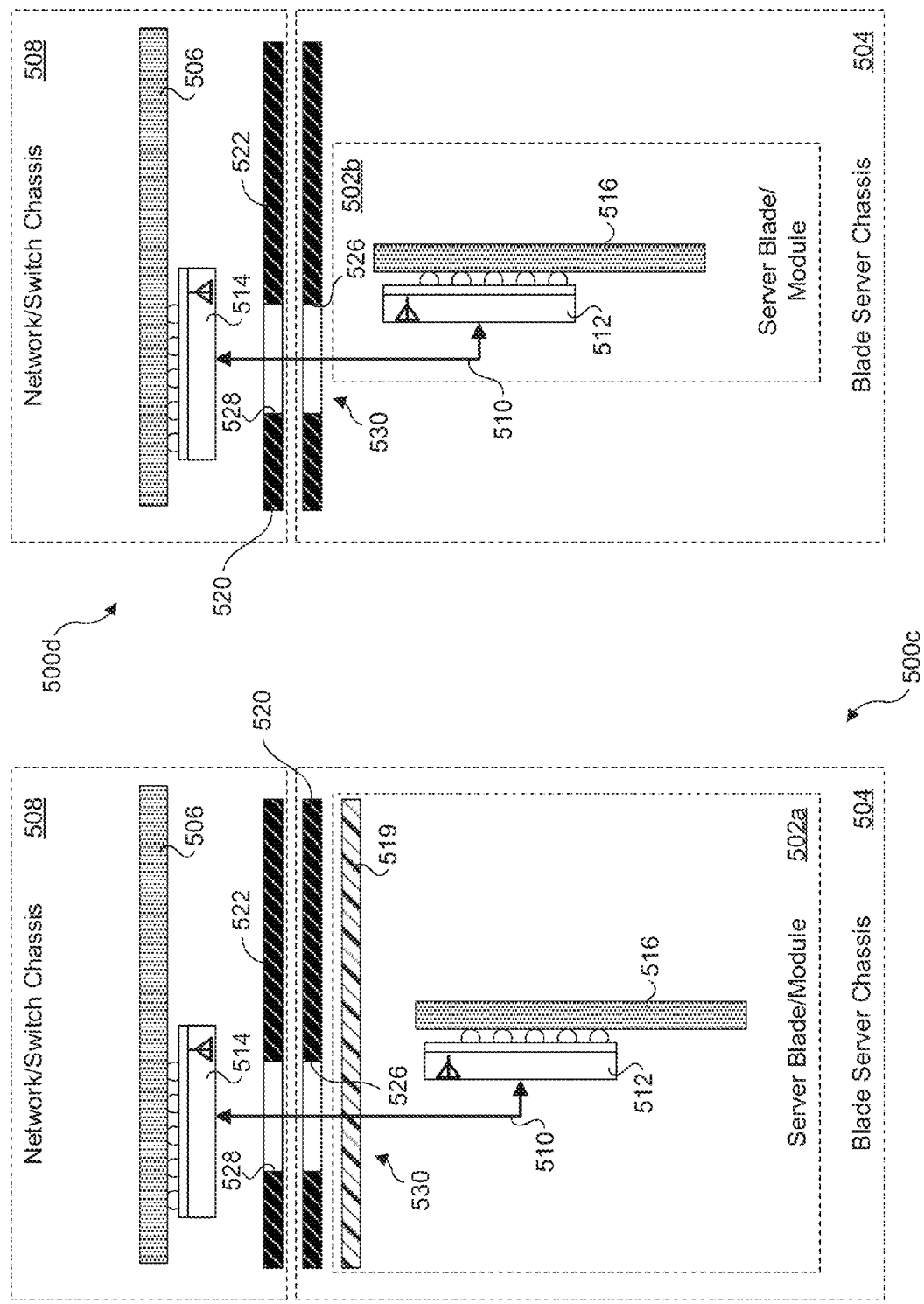
FIG. 5c illustrates a millimeter-wave wireless link between respective EHF transceiver chips in a network/switch chassis above a blade server chassis under which signals are passed through one plastic layer and holes in two metal layers, according to one embodiment.
FIG. 5d illustrates a millimeter-wave wireless link between respective EHF transceiver chips in a network/switch chassis above a blade server chassis under which signals are passed through holes in two metal layers, according to one embodiment.
Figure 5F:
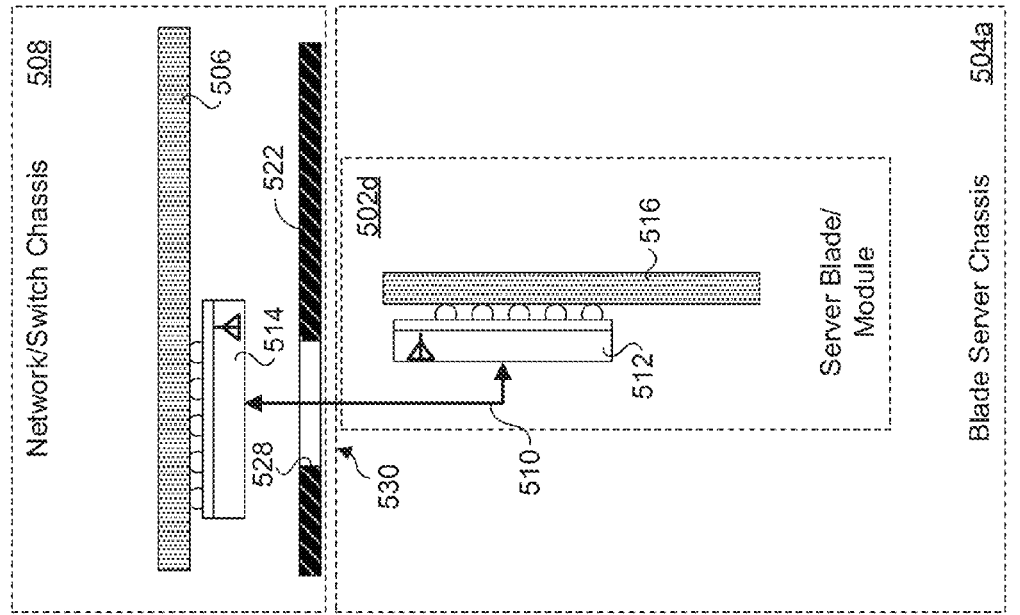
FIG. 5f illustrates a millimeter-wave wireless link between respective EHF transceiver chips in a network/switch chassis above a blade server chassis under which signals are passed through a hole in one metal layer, according to one embodiment.
Figure 5E:
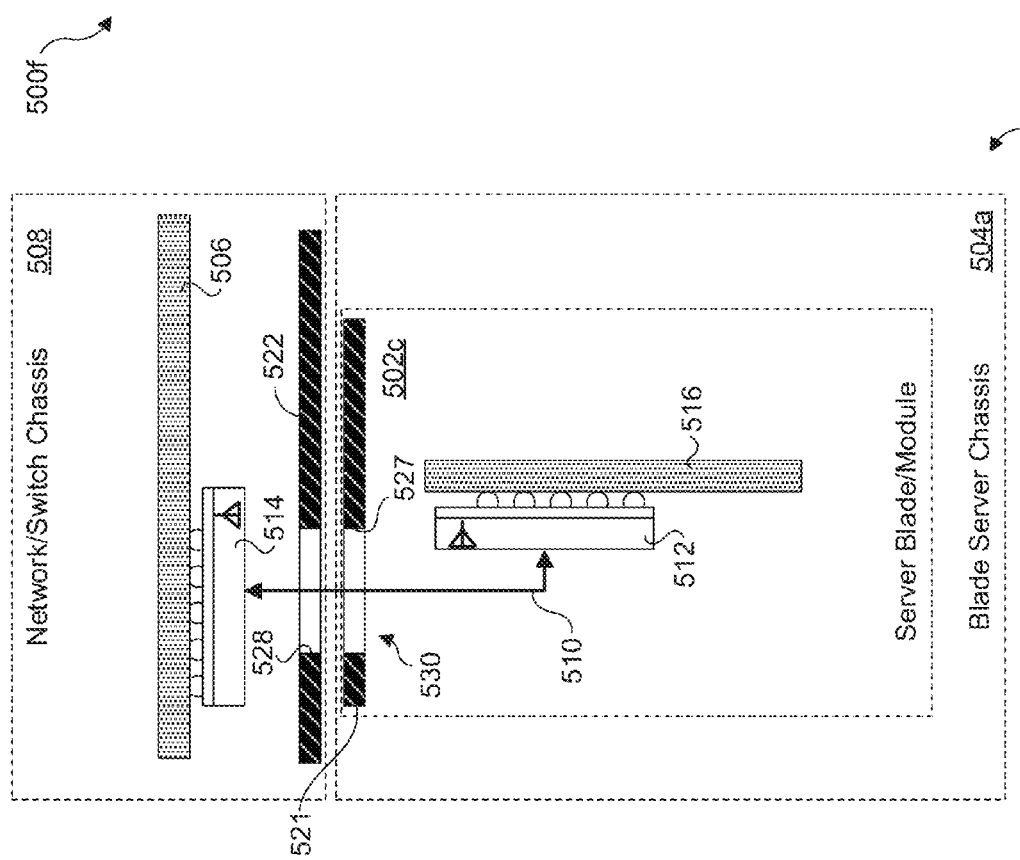
FIG. 5e illustrates a millimeter-wave wireless link between respective EHF transceiver chips in a network/switch chassis above a blade server chassis with an open top under which signals are passed through holes in two metal layers, according to one embodiment.

FIGS. 5a-5f illustrate various configurations under which server blades in a blade server chassis are enabled to wirelessly communicate with networking and/or switching components in a separate chassis. For example, FIGS. 5a and 5b illustrate a configuration 500 under which a server blade 502 in a blade server chassis 504 is enabled to communicate with networking circuitry on a backplane 506 in a network/switch chassis 508 via a an EHF millimeter-wave bi-directional wireless link 510 facilitated by a pair of EHF transceiver chips 512 and 514. As before, EHF transceiver chip 512 is mounted to a main board 516 (or daughterboard or similar) of server blade 502, which includes either an enclosure having a cover plate 518 or cover plate 518 is coupled to main board 516. The other two sheet metal layers illustrated in FIGS. 5a and 5b correspond to a blade server chassis cover plate 520 and a bottom plate 522 of network/switch chassis 508. Respective holes 524, 526, and 528 are formed in cover plate 518, cover plate 520, and bottom plate 522, thereby creating an open pathway 530 through which EHF millimeter-wave bi-directional wireless link 510 RF signals propagate.

Configuration 500c of FIG. 5c illustrates a server blade or module 502a that employs a plastic cover plate 519 rather than a metal cover plate. As above, depending on the attenuation of EHF RF signals by the plastic material, a hole through the cover plate may or may not need to be formed. Under a configuration 500d of FIG. 5d, server blade or module 502b does not employ a cover plate. Under a configuration 500e shown in FIG. 5e, blade server chassis 504a does not employ a cover plate, while server blade or module 502c employs a metal cover plate 521 with a hole 527 formed through it. Optionally, cover plate 521 could be made of plastic and may or may not include a hole (not shown). Under a configuration 500f of FIG. 5f, neither blade server chassis 504a nor server blade/module 502d employ a cover plate. Thus, the RF signals for EHF millimeter-wave bi-directional wireless link 510 only need to pass through a single metal sheet corresponding to bottom plate 522 of network/switch chassis 508.

As with any RF signal, the strength of the EHF millimeter-wave signal is a function of the RF energy emitted for the RF source (e.g., antenna) and the spectral attributes of the signal. In turn, the length of the wireless link facilitated between a pair of EHF transceiver chips will depend on the amount of RF energy received at the receiver's antenna and signal filtering and processing capabilities of the EHF receiver circuitry. In one embodiment, the aforementioned WCX100 chip supports multiple power output levels via corresponding control inputs via one or more of control pins 214. Under one embodiment, the distance between EHF transceiver chips is 2-15 mm, noting that this is merely exemplary and non-limiting. Generally, higher data transmission link bandwidth may be achieved when the link's pair of EHF transceiver chips are closer together and/or using more power.

To verify link performance capabilities and expectations under some of the embodiments disclosed herein, computer-based RF modeling was performed. Under one approach, the computational software (ANSYS HFSS) generated a visual representation of the signal strength of the RF signals emitted from a transmitting EHF transceiver chip. The models also considered the effect of the metal sheets/plates between pairs of EHF transceiver chips under various configurations.

Figure 6:
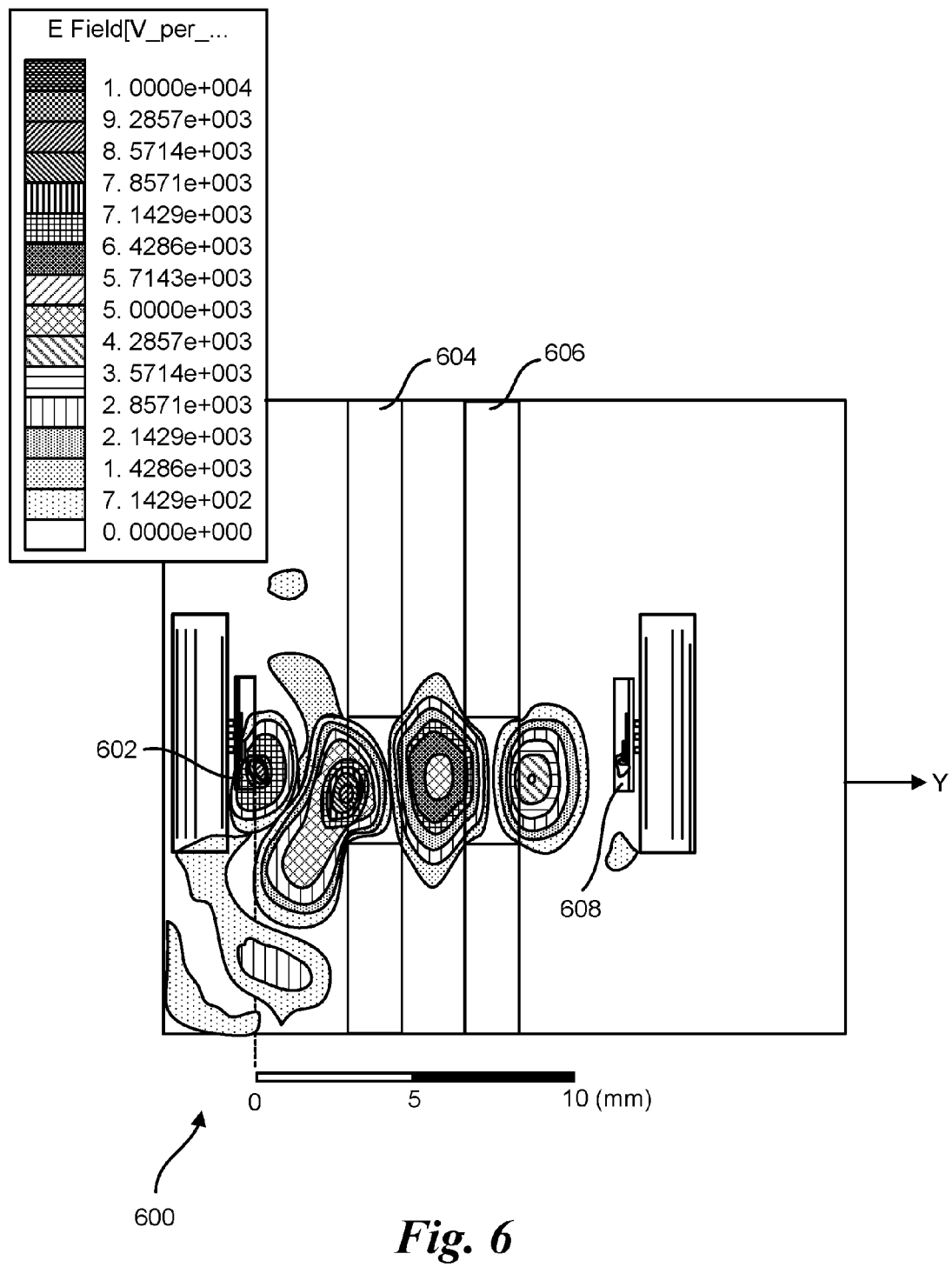
FIG. 6 is a graphic diagram depicting an electromagnetic field strength of signals emitted from a transmitting EHF transceiver chip and passing through holes in two metal layers using a vertical launch configuration.
Figure 7:
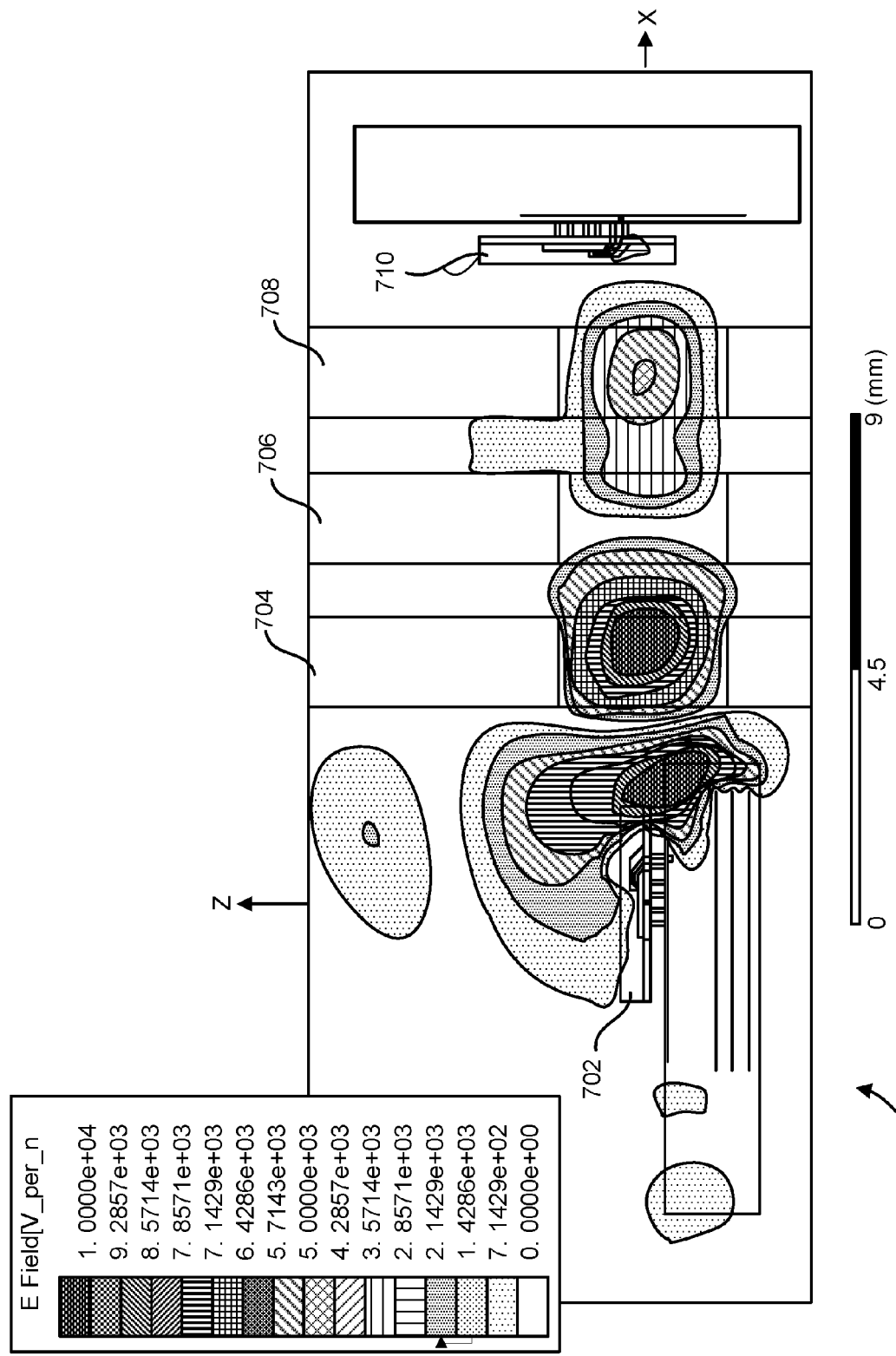
FIG. 7 is a graphic diagram depicting an electromagnetic field strength of signals emitted from a transmitting EHF transceiver chip and passing through holes in three metal layers using a diagonal launch configuration.

A snapshot 600 of the RF energy pattern for a configuration under which the RF signal emitted from a transmitting EHF transceiver chip 602 is modeled as passing through two metal sheets 604 and 606 before being received by a receiving EHF transceiver chip 608 is shown in FIG. 6. The model graphically illustrates the electro-magnetic field energy level in decibels. FIG. 7 shows a snapshot 700 of the RF energy pattern for a configuration under which the RF signal emitted from a transmitting EHF transceiver chip 702 is modeled as passing through three metal sheets 704, 706 and 708 before being received by a receiving EHF transceiver chip 710. In addition to these configurations, various other configurations were modeled, including variations in the size of the holes in the metal sheets/plates, the number of metal sheets/plates, the distance between the pair of EHF transceiver chips, the orientation of the EHF transceiver chips (e.g., vertical launch, side launch, diagonal launch, amount of alignment offset, etc.).

Generally, the teachings and principles disclosed herein may be implemented to support wireless communication between components in separate chassis that are adjacent to one another (e.g., one chassis on top of another chassis in the rack). Various non-limiting examples of configurations supporting wireless communication between chassis using EHF transceiver chips are shown in FIGS. 8a, 8b, 9a, 9b, 10a, 10b, 11a, 11b, 12a, 12b, 13a, 13b, 14a, and 14b. It will be understood that the configurations shown in these figures are simplified to emphasize the millimeter-wave wireless communication facilitated through use of EHF transceiver chips. Accordingly, these illustrative embodiments may show more or less EHF transceiver chips than might be implemented, and actual implementations would include well-known components that are not shown for convenience and simplicity in order to not obscure the inventive aspects depicted in the corresponding Figures. In addition, the illustrated embodiment may not be to scale, and may present partial or transparent components to reveal other components that would otherwise be obscured.

Figure 8A:
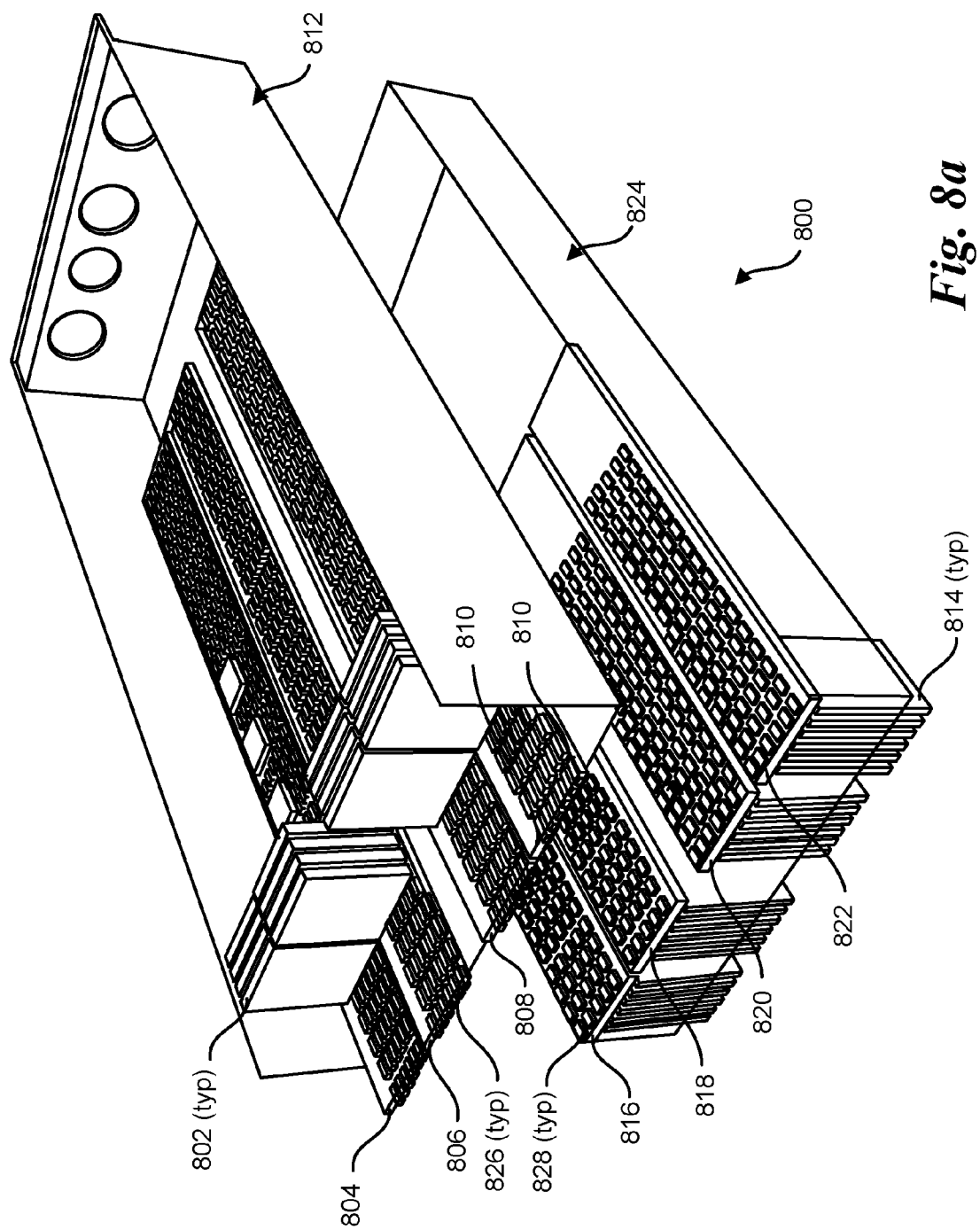
FIGS. 8a and 8b illustrate a configuration under which an array of EHF transceiver chips in a server chassis are wirelessly linked with an array of EHF transceiver chips in a storage chassis below the server chassis, according to one embodiment.
Figure 8B:
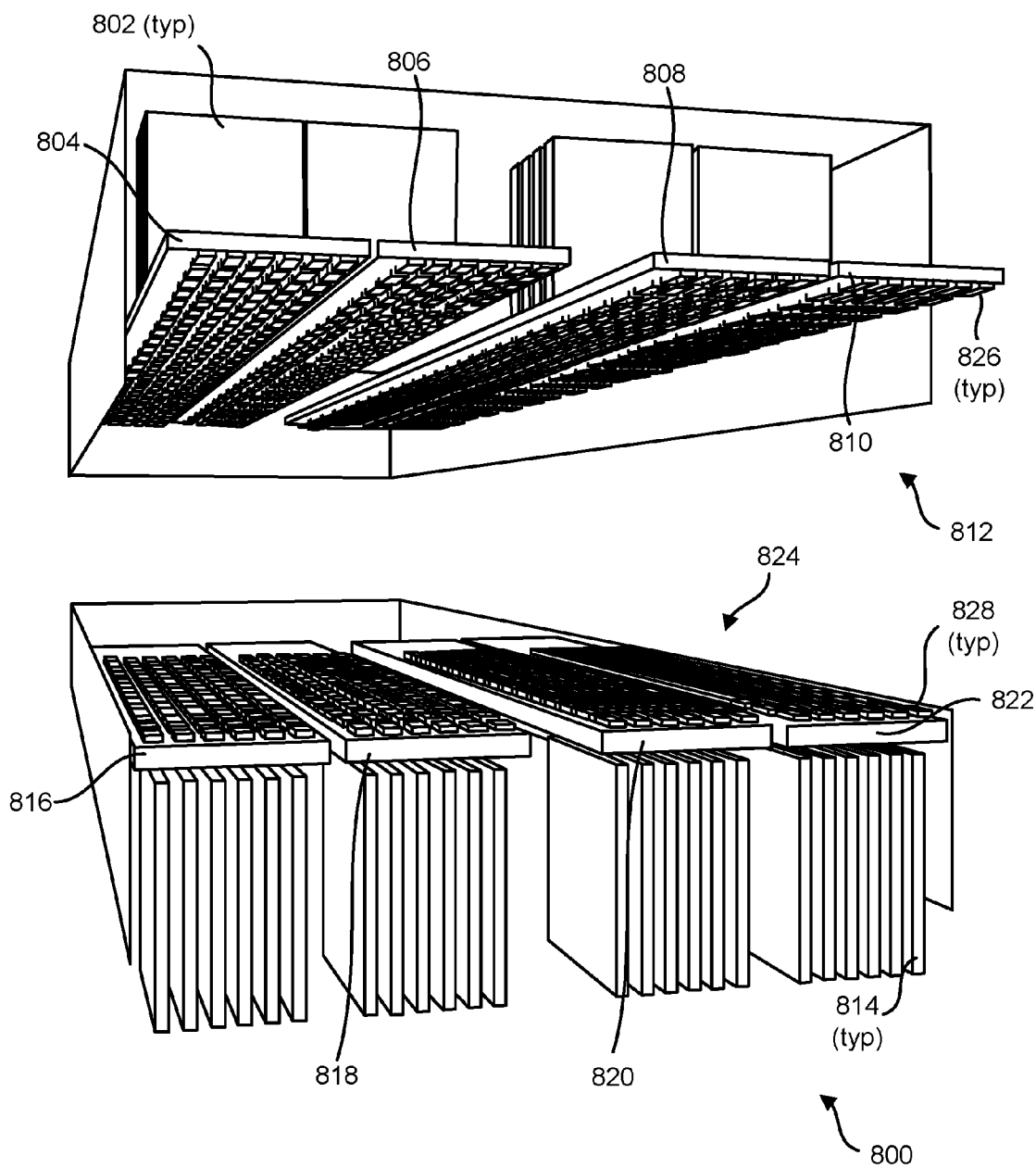

In a configuration 800 of FIGS. 8a and 8b, an array of server modules 802 are mounted to backplanes 804, 806, 808, and 810 in an upper server chassis 812. In one exemplary embodiment, server modules 802 comprising Intel®

Avoton™ servers modules. Meanwhile, a plurality of storage drives 814 are coupled to backplanes 816, 818, 820, and 822 in a lower storage chassis 824. Each of backplanes 804, 806, 808, and 810 contain an array of downward-facing EHF transceiver chips 826, while each of backplanes 816, 818, 820, and 822 contain an array of upward-facing EHF transceiver chips 828, wherein the arrays of the EHF transceiver chips are configured such that the downward-facing EHF transceiver chips are aligned respective upward-facing EHF transceiver chips on a pairwise basis. In addition to what is shown in FIGS. 8*a* and 8*b*, there would be arrays of holes (not shown) in a bottom 830 of upper chassis 812 and a cover plate (not shown) of lower storage chassis 824.

Figure 9A:
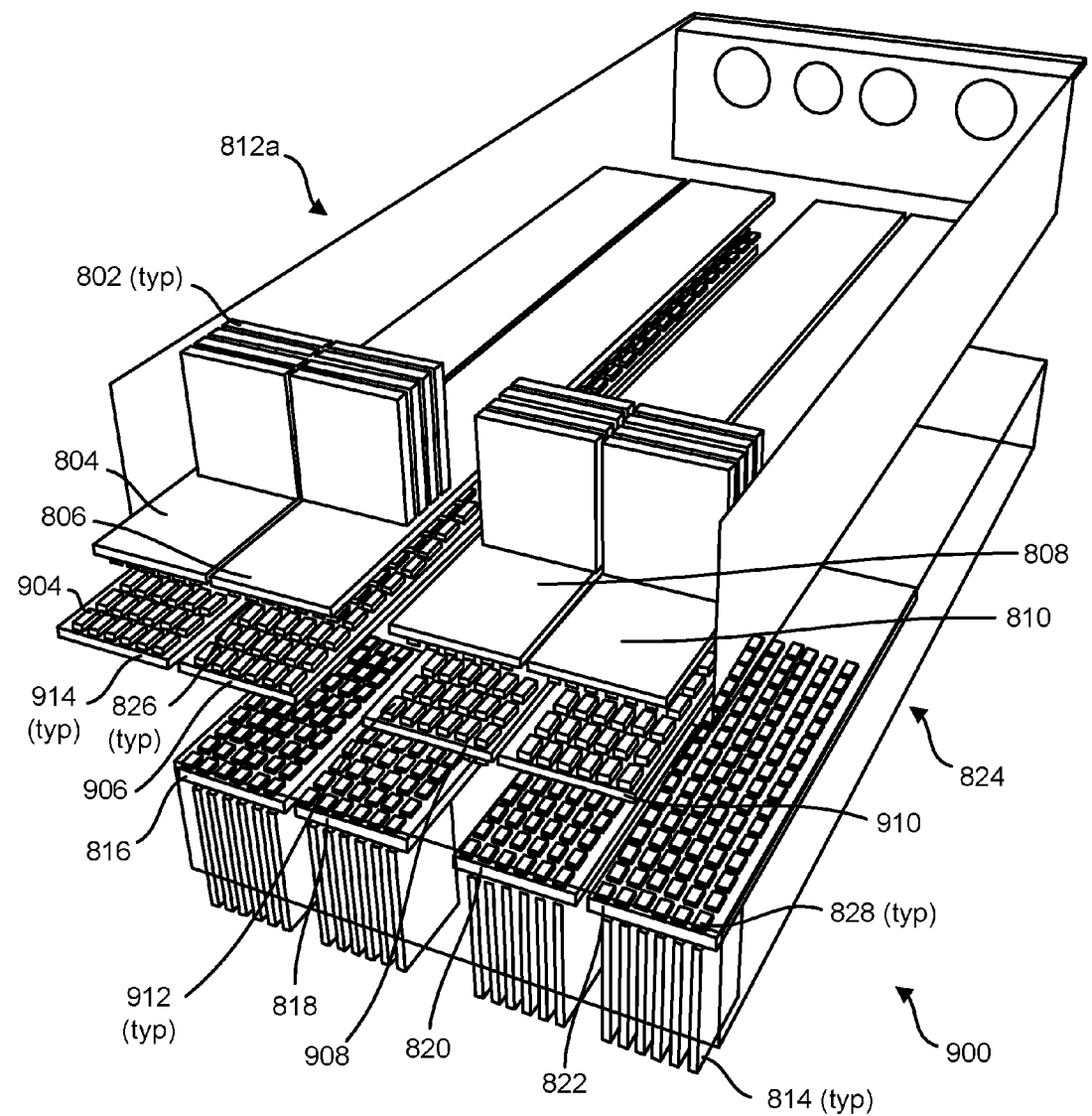
FIGS. 9a and 9b illustrated a modified version of the configuration of FIGS. 8a and 9b further adding four fabric backplanes with EHF transceiver chips on both sides in the server chassis, according to one embodiment.
Figure 9B:
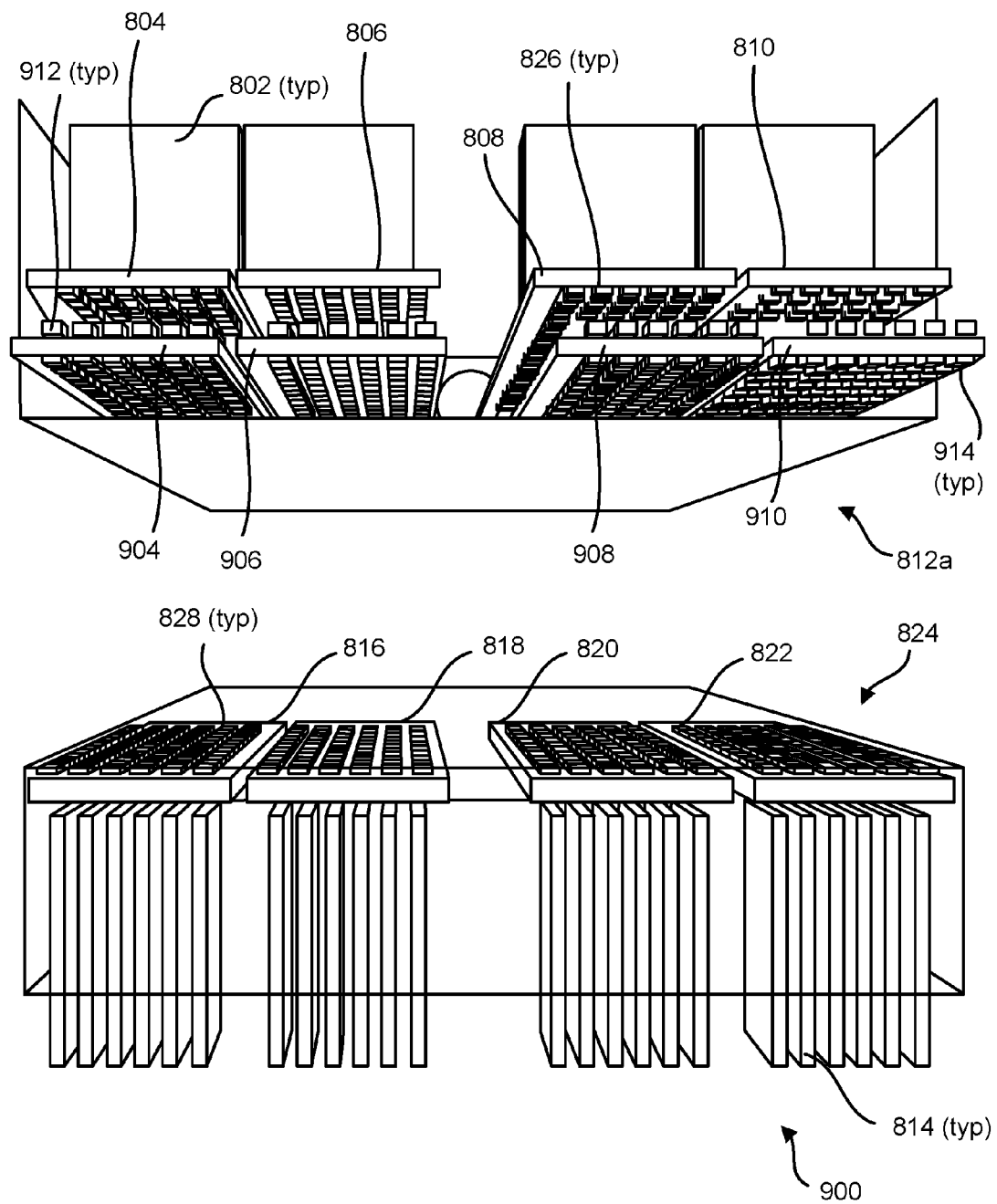

FIGS. 9*a* and 9*b* show a configuration 1000 under which a server chassis 812*a* comprising a modified version of server 812 is installed above a storage chassis 824. As illustrated, server chassis 812 now further includes four fabric backplanes 904, 906, 908 and 910 disposed below backplanes 804, 806, 808, and 810. Each of fabric backplanes 904, 906, 908 and 910 includes an array of upward-facing EHF transceiver chips 912 mounted to its topside an array of downward-facing EHF transceiver chips 914 mounted to its underside. Upward-facing EHF transceiver chips 828 are configured to be substantially aligned with downward-facing transceiver chips 826 on backplanes 804, 806, 808, and 810. Similarly, downward-facing EHF transceiver chips 914 are configured to be substantially aligned with upward-facing transceiver chips on 828 on backplanes 816, 818, 820, and 822.

Figure 10A:
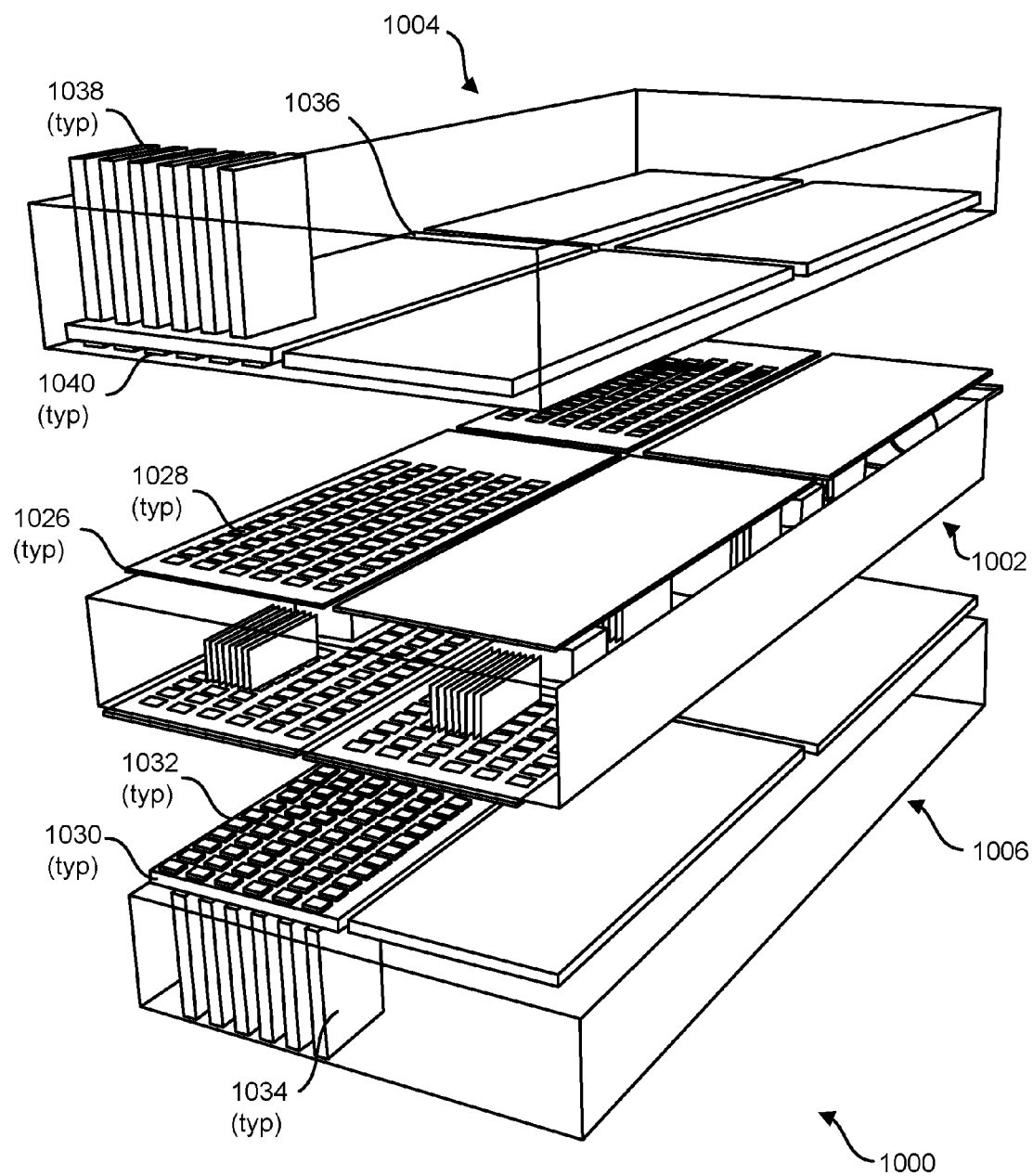
FIGS. 10a and 10b illustrate a configuration under which components in a middle server chassis are enabled to wirelessly communicate with components in storage chassis above and below the server chassis, according to one embodiment.
Figure 10B:
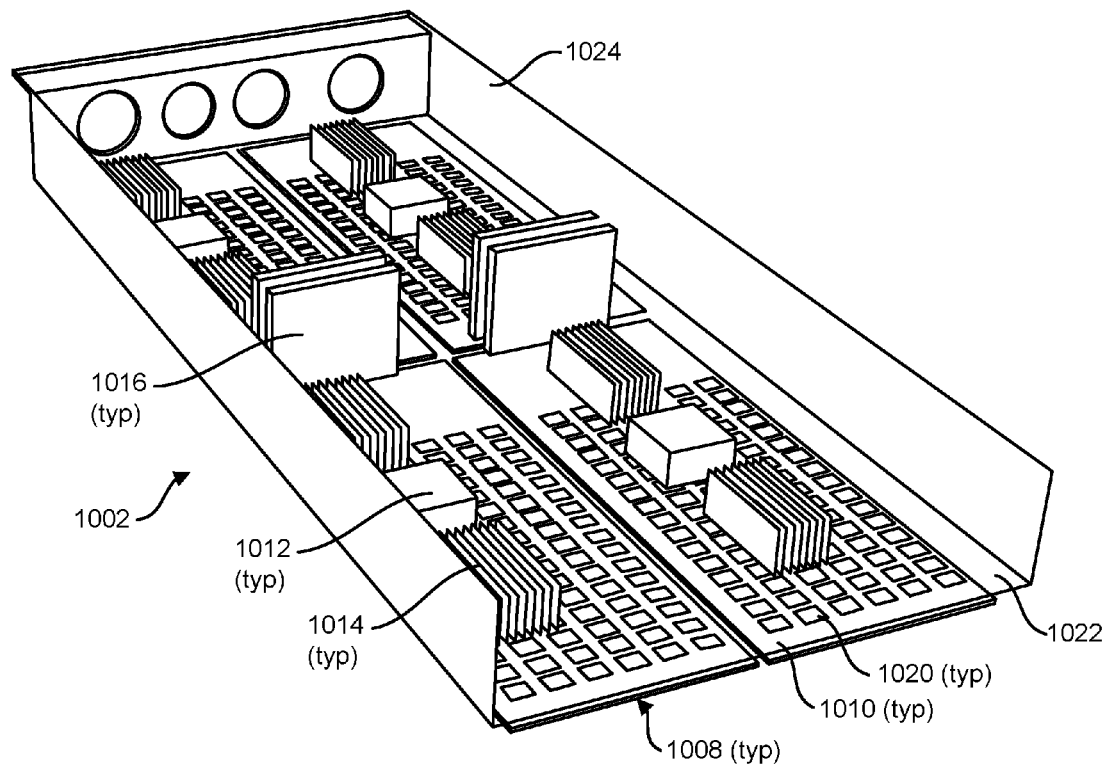

FIG. 10*a* shows a configuration 1000 under which a middle server chassis 1002 is sandwiched between an upper storage chassis 1004 and a lower storage chassis 1006, with further details of middle server chassis 1002 depicted in FIG. 10*b*. Server chassis 1002 includes server board assemblies 1026, each including a backplane 1010 to which various components are mounted on a topside thereof including a processor 1012, a plurality of memory modules 1014, and an InfiniBand host bus adaptor (HBA) 1016. Processor 1012 is generally illustrative of one or more processors that may be included with each server board assembly 1008. An array of EHF transceiver chips 1020 are mounted to the underside of each backplane 1010. In addition, there would be a hole pattern having a configuration similar to the EHF transceiver chips 1020 in the base plate 1022 of a chassis frame 1024 (not shown for clarity).

As shown in FIG. 10*a*, server chassis 1002 also includes an upper set of four backplanes 1026, each including an array of upward-facing EHF transceiver chips 1028. In one embodiment, backplanes 1026 are communicatively coupled to backplanes 1010 via some form of physical connections, such as but not limited to connectors between pairs of backplanes or ribbon cables. In the illustrated embodiments, pairs of upper and lower backplanes are each connected to an HBA 1016 that further supports communication between the backplanes.

Lower storage chassis 1006 is generally configured in a similar manner to lower storage chassis 824, except the shape of each of four backplanes 1030 is different than backplanes 816, 818, 820, and 822. As before, an array of upward-facing EHF transceiver chips 1032 is mounted to each backplane 1030, while a plurality of storage drives 1034 are coupled to an underneath side of the backplanes via applicable connectors. There also would be an array of holes in the cover plate of lower storage chassis 1006 (not shown) that would be aligned with the array of EHF transceiver chips 1032.

Upper storage chassis 1004 is generally configured in a similar manner to lower storage chassis 1006, but with its vertical orientation flipped. As a result, each of four backplanes 1036 include a plurality of storage devices 1038 coupled to its topside, and an array of downward-facing EHF transceiver chips 1040. Upper storage chassis 1004 would also have an array of storage drives 1038.

Figure 11A:
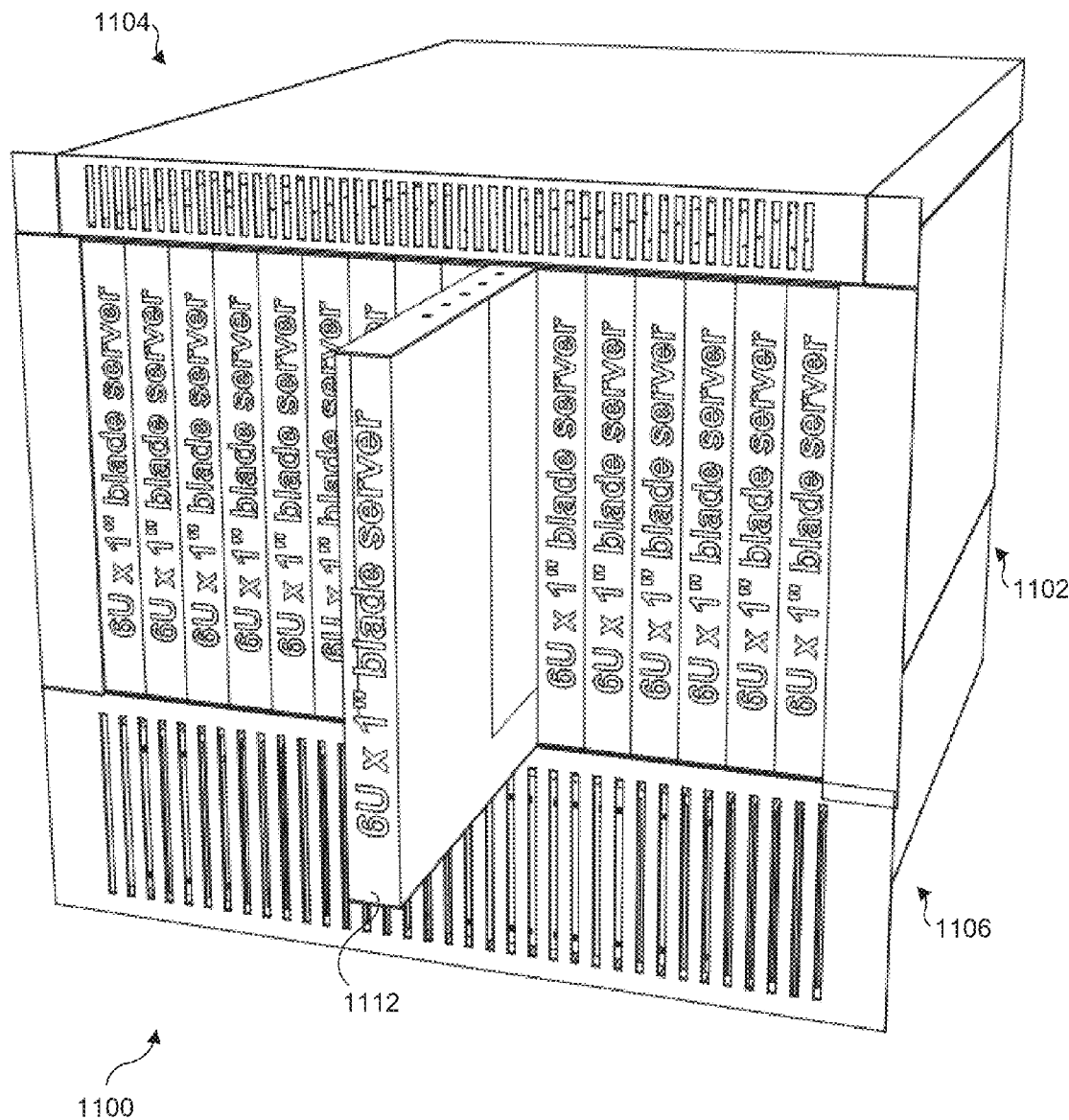
FIGS. 11a and 11b illustrate a configuration under which a 6U server chassis is disposed below a network/switch chassis and above a storage array, according to one embodiment.
Figure 11B:
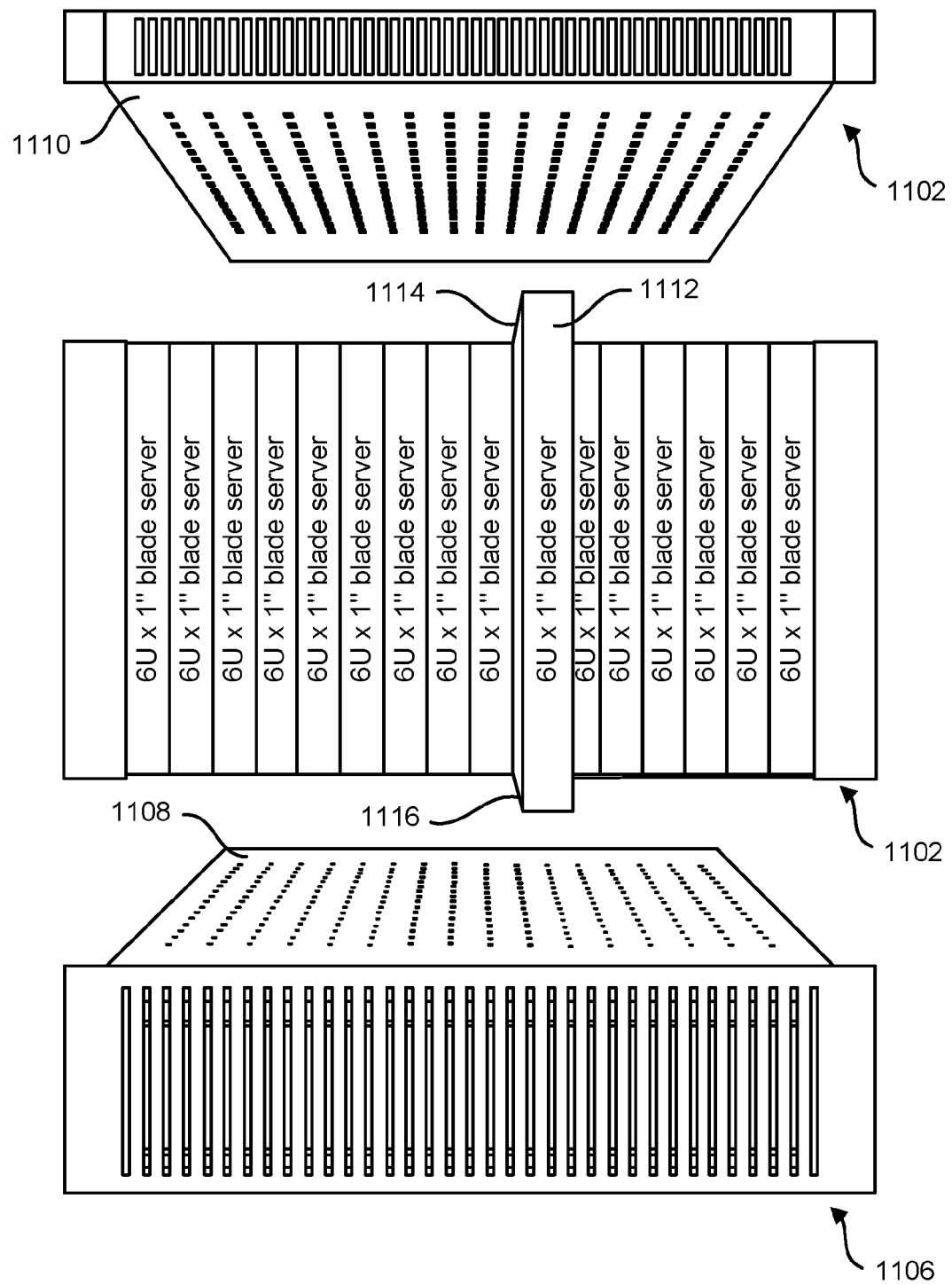

FIGS. 11*a* and 11*b* illustrate a configuration 1100 including a 6U blade server chassis 1102 disposed under a switch chassis 1104 and above a storage array 1006. As shown in FIG. 11*b*, arrays of holes are formed in a cover plate 1108 of storage array 1006 and in a base plate 1110 of switch chassis 1004. Each of a plurality of server blades 1112 installed in blade server chassis 1102 includes a frame having an upper plate 1114 and a lower plate 1116 through which a plurality of holes are formed adjacent to EHF transceiver chips along the top and bottom edges of the server blade's main board (not shown), which is mounted to the frame. In addition, the cover and base plate of blade server chassis 1102 (not shown) will also include a plurality of holes that are substantially aligned with the holes in upper plate 1114 and lower plate 1116 when blade servers 1112 are installed in server chassis 1002.

Figure 12A:
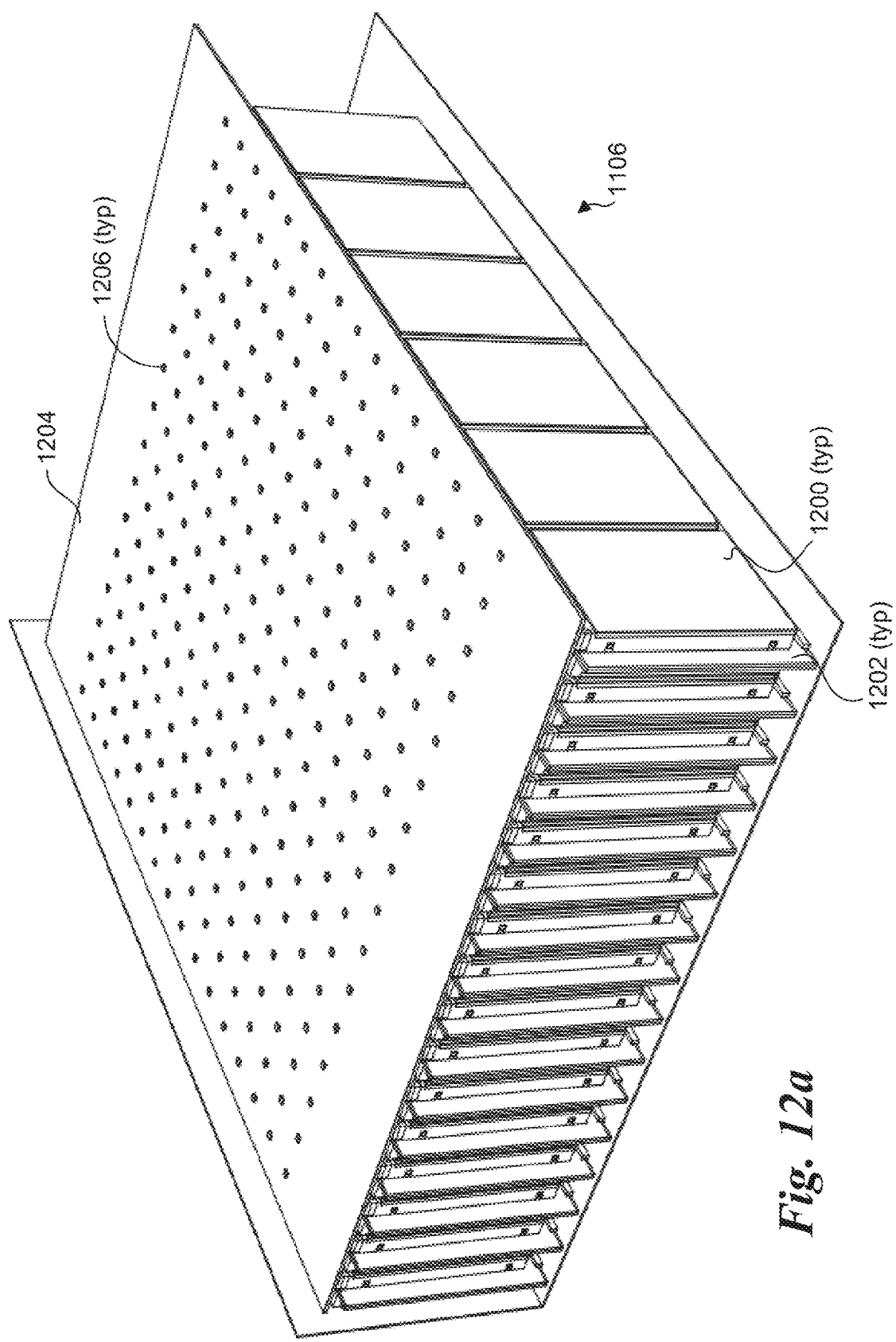
FIGS. 12a and 12b respective show topside and underside isometric perspective views of a storage array employing an upper backplane including an array of EHF transceiver chips, according to one embodiment.
Figure 12B:
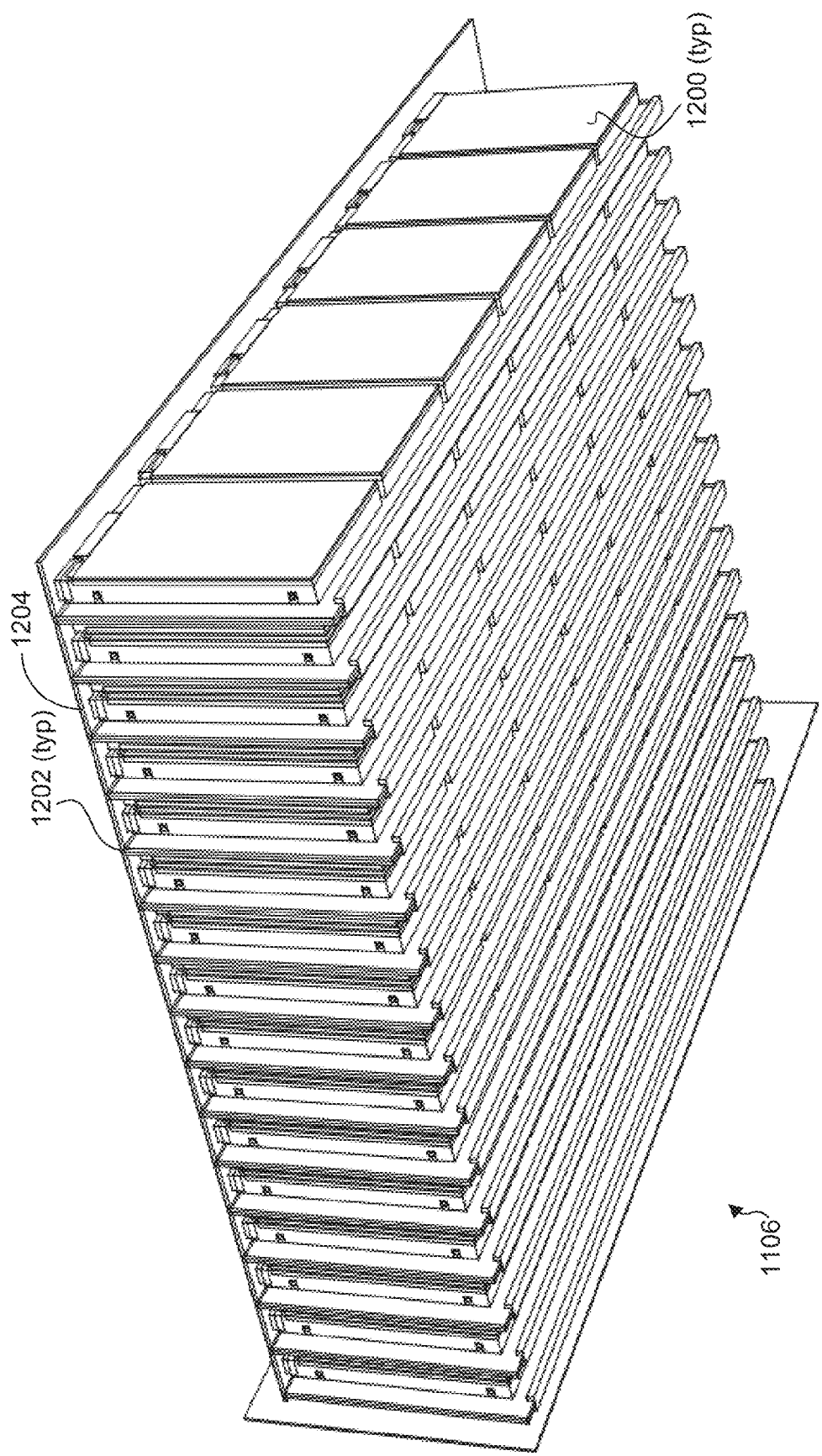

FIGS. 12*a* and 12*b* show further details of storage array 1106, according to one embodiment. A plurality of storage drives 1200 are mounted to and communicatively coupled with (e.g., via SATA connectors) vertical boards 1202. In turn, the vertical boards 1202 are communicatively coupled with a backplane 1204 including an array of EHF transceiver chip 1206. In the illustrated embodiment, storage drives comprise 2½ inch drives that are mounted back to back. Storage drives having other form factors, such as 3½ inch drives may be used in other embodiments.

Figure 12C:
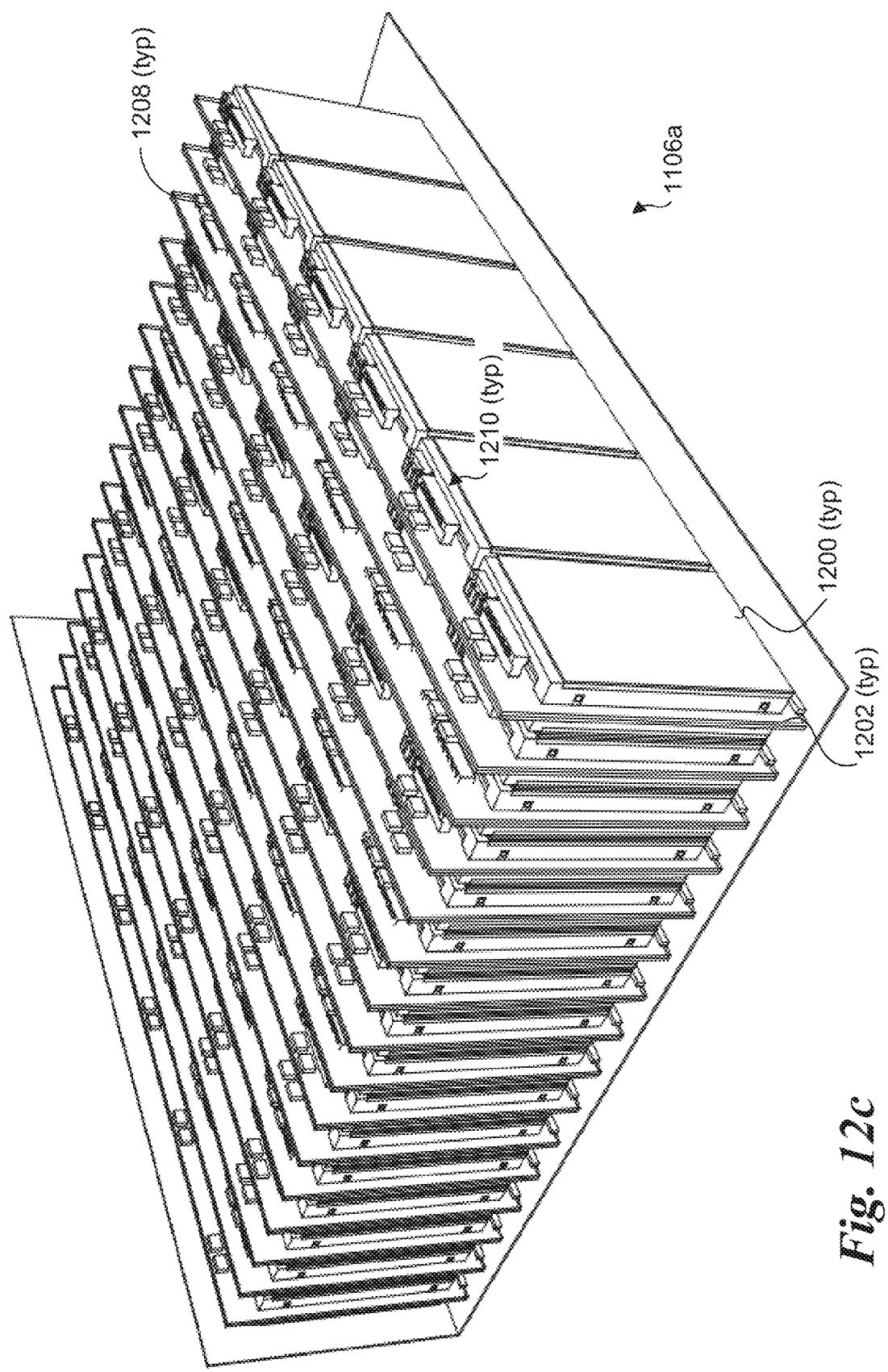
FIG. 12c shows a topside isometric perspective view of a storage array employing EHF transceiver chips mounted to vertical boards to which storage drives are coupled, according to one embodiment.

FIG. 12*c* shows an embodiment of a storage array 1106*a*. Under the illustrated configuration, EHF transceiver chips 1208 are mounted toward the top of vertical boards 1202. In the illustrated embodiment one EHF transceiver chip 1208 is implemented for each drive; however, this is merely exemplary, as multiple EHF transceiver chips may be used for one or more drive. Also in the illustrated embodiment the EHF transceiver chips 1208 are mounted on a single side of vertical boards 1202; optionally, EHF transceiver chips may be mounted on both sides of the vertical boards.

Figure 12D:
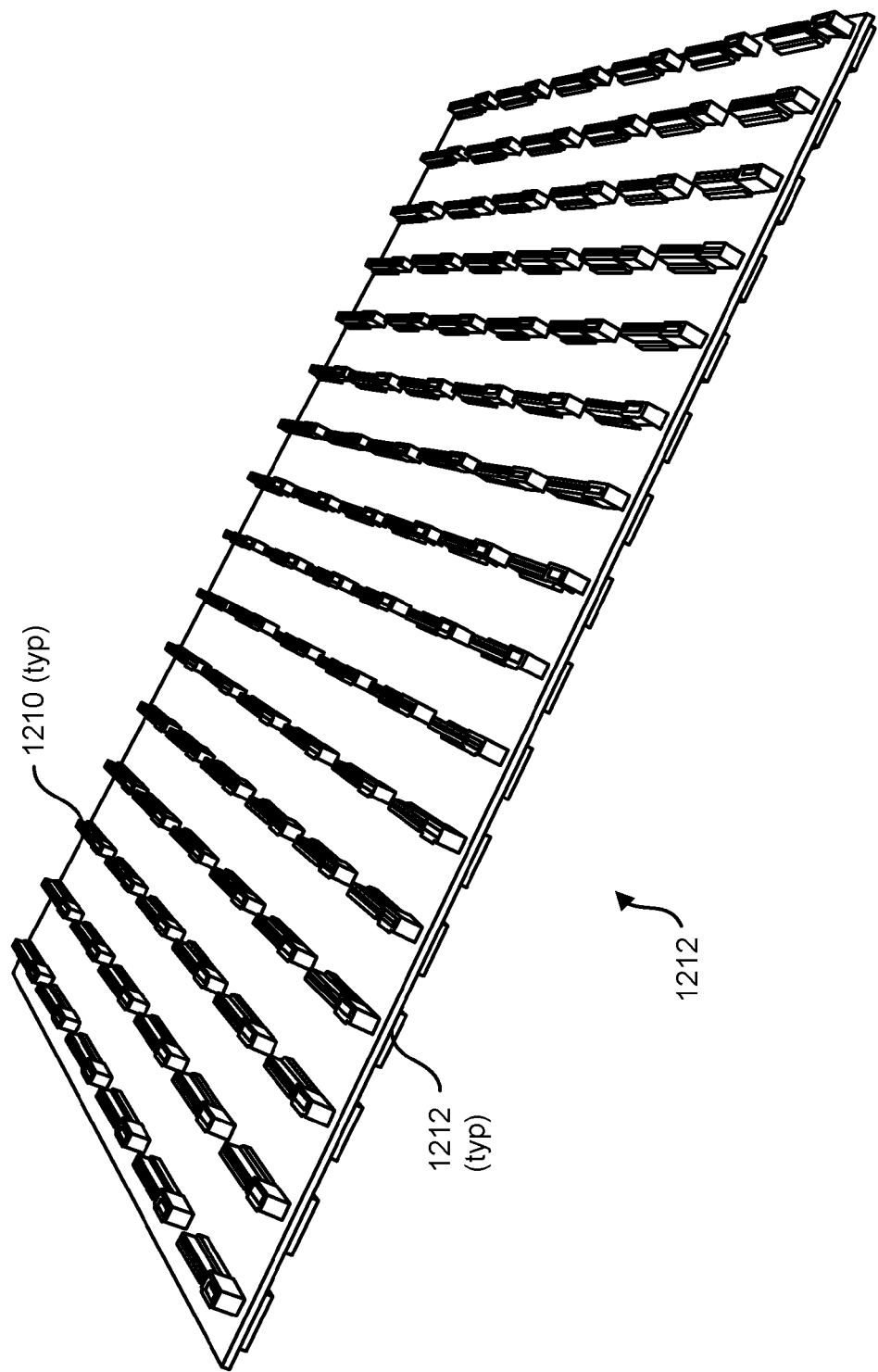
FIG. 12d illustrates a backplane configured for use in a storage array including an array of SATA connectors on its topside and an array of EHF transceiver chips on its underside.
Figure 13A:
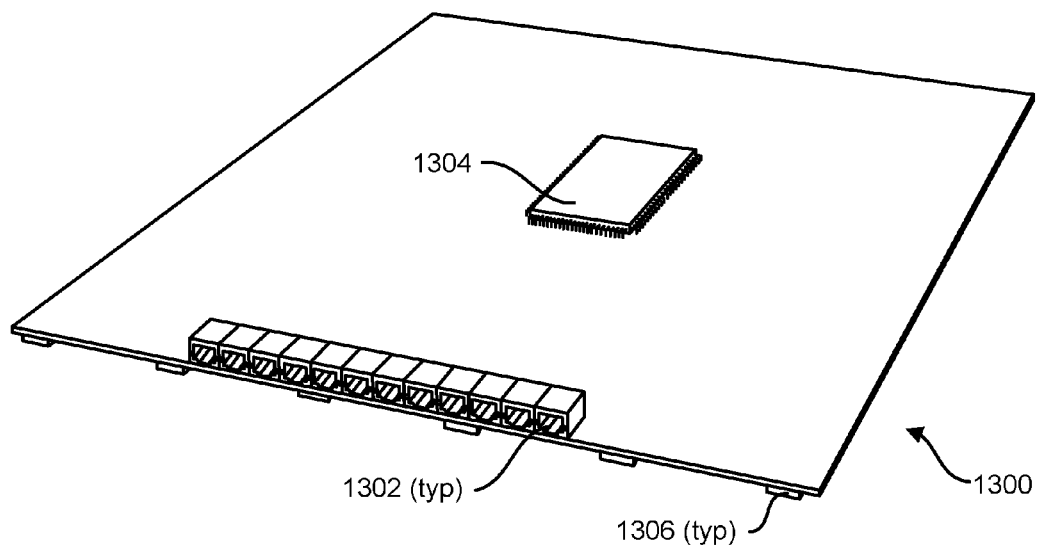
FIGS. 13a and 13b illustrate a backplane configured for use in a network/switch chassis, according to one embodiment.
Figure 13B:
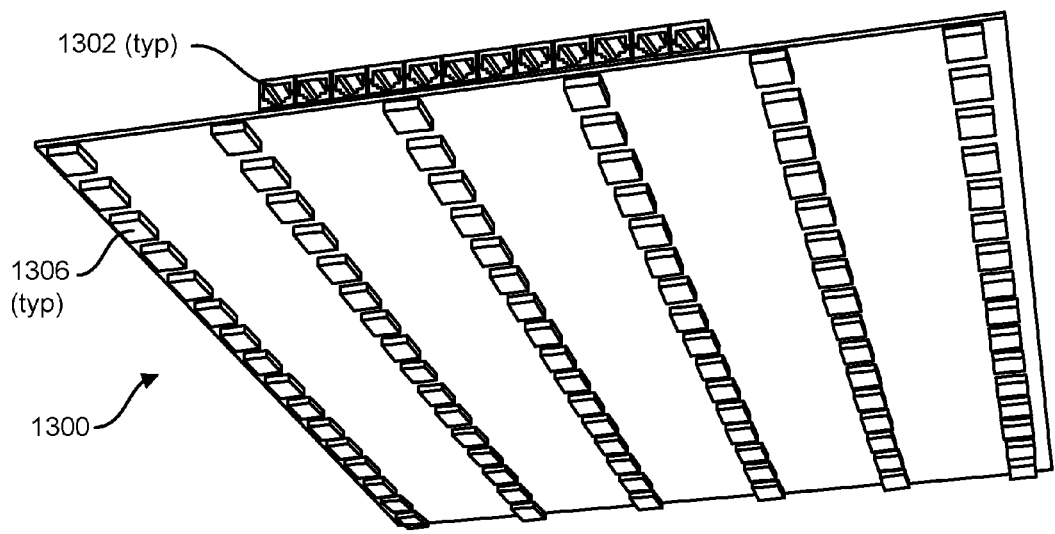

As shown in FIG. 12*d*, in one embodiment a plurality of SATA connectors 1210 are mounted to a backplane 1212 having an array of EHF transceiver chips 1214. In one configuration, backplane 1212 is disposed in the bottom of a chassis with SATA connectors 1210 pointing upward and EHF transceiver chips 1214 pointing downward. In another configuration, backplane 1212 is inverted and disposed toward the top of a chassis with EHF transceiver chips 1214 pointing upward and SATA connectors 1210 pointing downward.

EHF transceiver chips may be implemented in networking related chassis, such as switch chassis and network chassis or a network/switch chassis that includes components supporting networking and switching functions. Generally, a network/switch chassis may employ a single backplane or two backplanes arrayed with EHF transceiver chips, such as illustrated by a network/switch backplane 1300 in FIGS. 13*a* and 13*b*. In this example, a plurality of Ethernet network connectors 1302 comprising RJ45 Ethernet jacks are mounted on a topside of network/switch backplane 1300, while an array of EHF transceiver chips 1304 are mounted on the underside of the backplane. Wire traces in network/switch backplane 1300 are routed to network connectors 1302 and a multi-port network/switch chip 1304. Although only a single multi-port network/switch chip is shown, it will be understood that multiple chips of similar configuration may be implemented on a network/switch backplane, and that network ports and switch operations may also be implemented on separate chips or otherwise using separate circuitry and logic. Multi-port network/switch chip 1304 also is connected via wire traces in network/switch backplane 1300 to EHF transceiver chips 1306. In addition, applicable interface circuitry and signal-conditioning circuitry (not shown) may be implemented using techniques and principles well-known in the art.

The terminology network/switch is meant to convey the apparatus may be implemented for networking and switching functions. Depending on the particular system needs or architecture, a network/switch chassis may include various numbers of external network ports that are used to interface with other servers, storage devices, etc. in other chassis and/or other racks, such as 4, 8 12, 16, 24, etc. In some implementations, a network/switch backplane may be configured to support switching functionality related to internal communications in a manner similar to some switch cards used in data centers and the like.

Figure 14A:
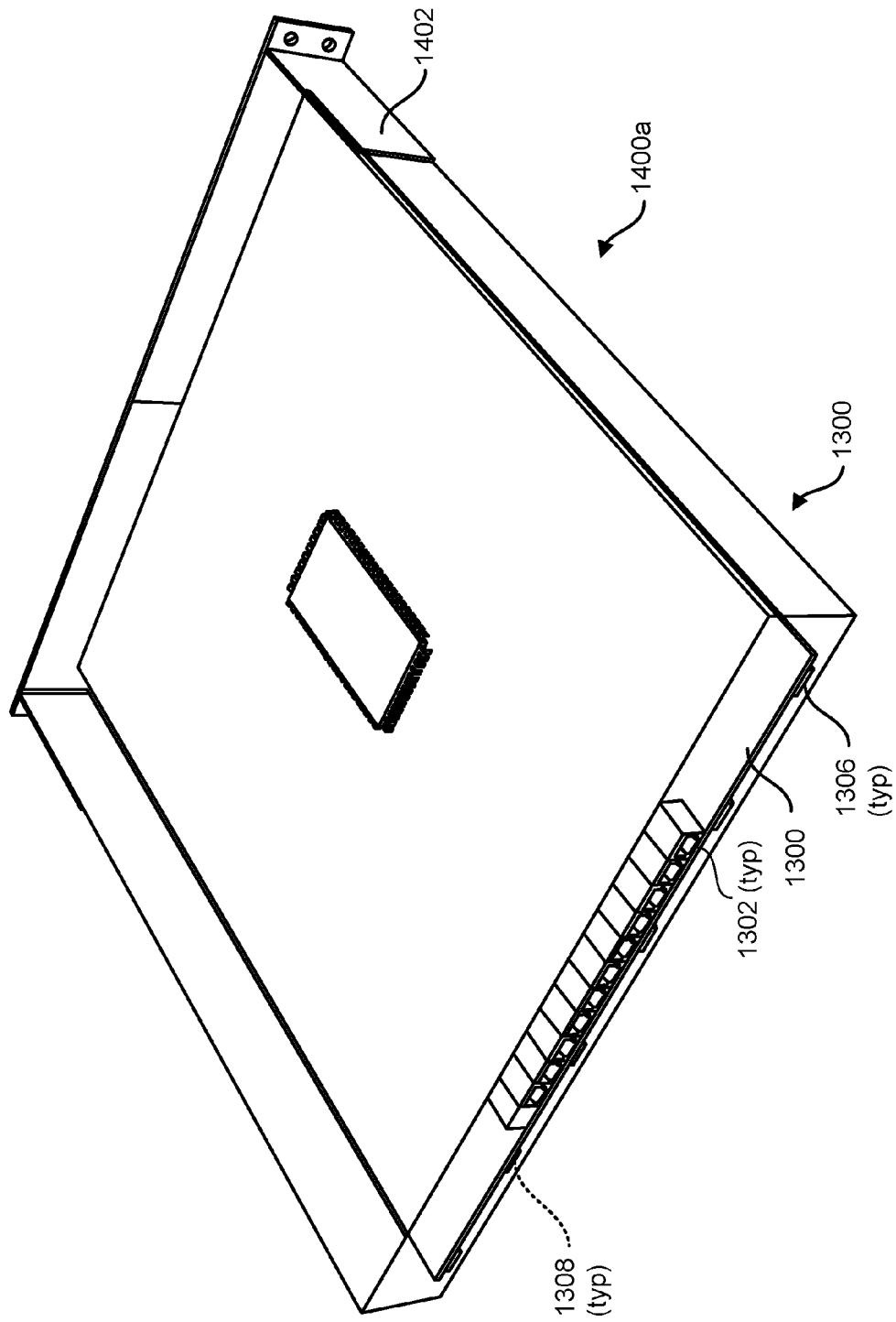
FIG. 14a shows a network switch chassis implementing the backplane of FIGS. 13a and 13b.
Figure 14B:
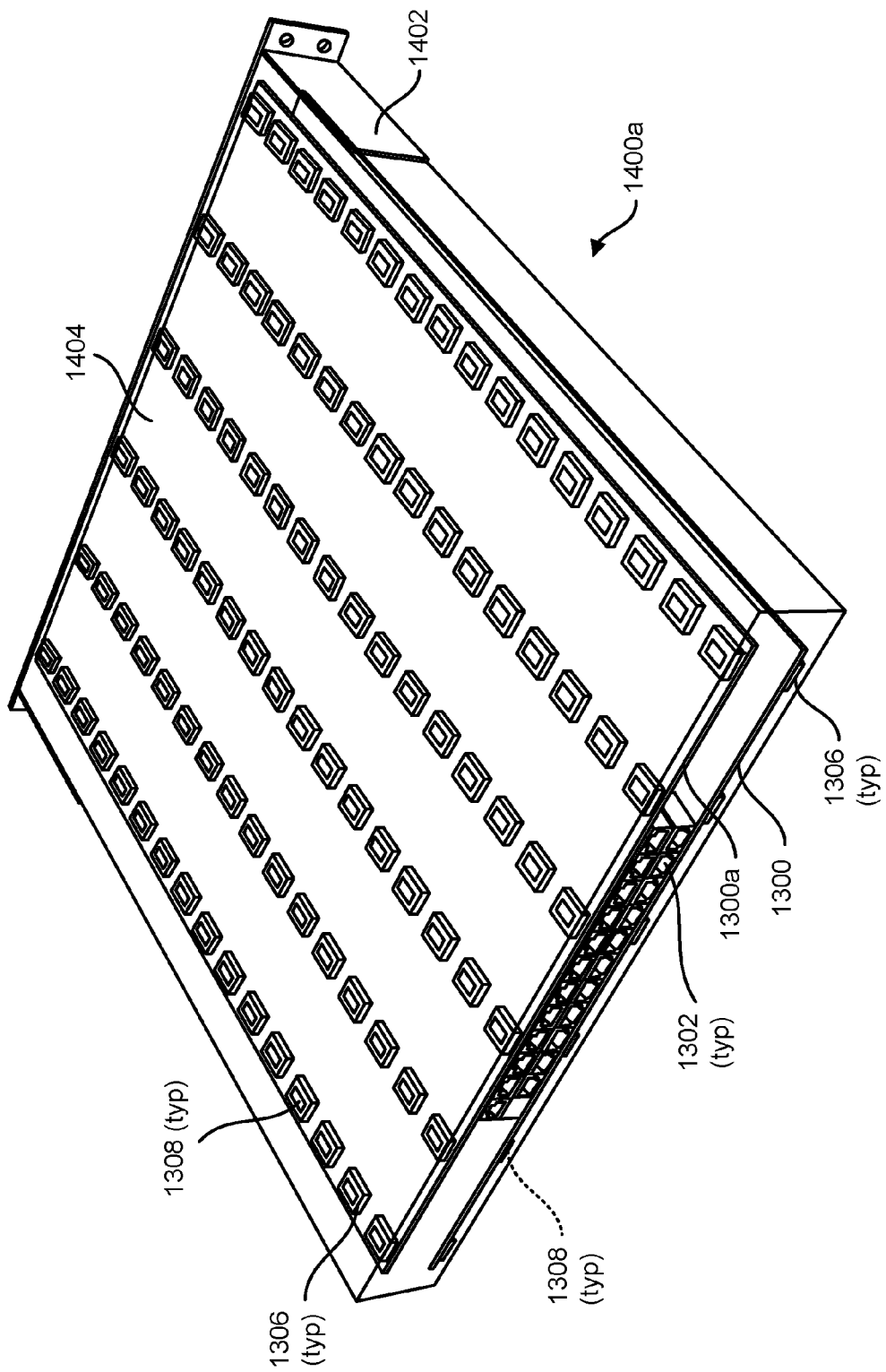
FIG. 14b shows a network switch chassis implementing two backplanes of FIGS. 13a and 13b under which the upper backplane is inverted.

FIGS. 14a and 14b respectively show exemplary 1U network/switch chassis that support wireless connections with a chassis below (for network/switch chassis 1400a) and with both a chassis above and below (for a network/switch chassis 1400b). As shown in FIG. 14a, a network/switch backplane 1300 is mounted within a 1U chassis frame 1402, with network connectors 1302 mounted toward the rear of the chassis frame. Network/switch chassis 1400b further adds a second network/switch backplane 1300a this is mounted such that EHF transceiver chips 1404 are just below a top) of 1U chassis frame 1402 in which a plurality of holes 1308 are defined proximate to each EHF transceiver chip.

Figure 15:
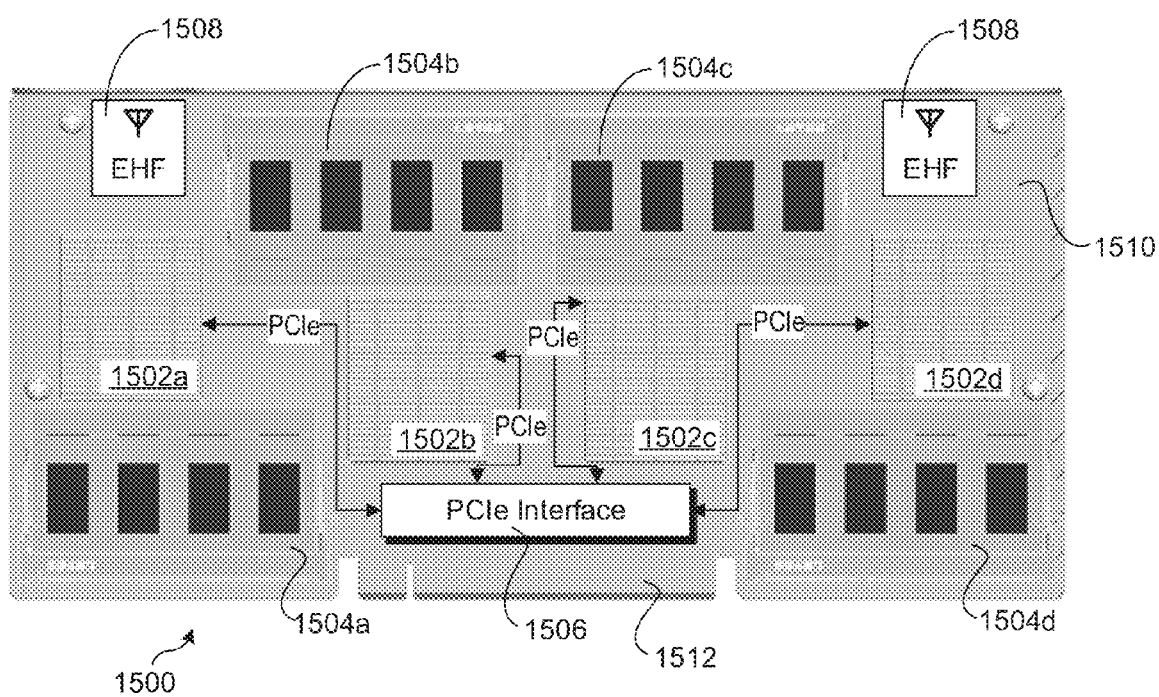
FIG. 15 illustrates a server module including a pair of EHF transceiver chips mounted to its main PCB board, according to one embodiment.

A server module 1500 configured to facilitate wireless communication with components in another chassis is shown in FIG. 15. Server module 1500 includes four CPU subsystems comprising Systems on a Chip (SoCs) 1502a, 1502b, 1502c, and 1502d, each coupled to respective memories 1504a, 1504b, 1504c, and 1504d. Each of SoCs 1502a, 1502b, 1502c, and 1502d is also communicatively coupled to PCIe interface 1506 via a respective PCIe link. Each of SoCs 1502a, 1502b, 1502c, and 1502d also has access to an instruction storage device that contains instructions used to execute on the processing cores of the SoC. Generally, these instructions may include both firmware and software instructions, and may be stored in either single devices for a module, or each SoC may have its own local firmware storage device and/or local software storage device. As another option, software instructions may be stored on one or more mass storage modules and accessed via an internal network during module initialization and/or ongoing operations.

Each of the illustrated components are mounted either directly or via an applicable socket or connector to a printed circuit board (PCB) 1510 including wiring (e.g., layout traces and vias) facilitating transfer of signals between the components. This wiring includes signal paths for facilitating communication over each of the PCIe links depicted in FIG. 15. PCB 1510 also includes wiring for connecting selected components to corresponding pin traces on an edge connector 1512. In one embodiment, edge connector 1512 comprises a PCIe edge connector, although this is merely illustrative of one type of edge connector configuration and is not to be limiting. In addition to an edge connector, an arrayed pin connector may be used, and the orientation of the connector on the bottom of PCB 1510 in FIG. 15 is exemplary, as an edge or arrayed pin connector may be located at an end of the PCB, which is a common configuration for a blade server.

As further shown in FIG. 15, server module 1500 includes a pair of EHF transceiver chips 1508 that are mounted toward the top edge of PCB 1510. This configuration is similar to that shown by Server Blade/Module 402 in FIG. 4d, Server Blade/Module 402b in FIG. 4e, and Server Blade/Module 402c in FIG. 4f. In general, a server module that supports communication via millimeter-wave wireless links may employ one or more EHF transceiver chips, which may be mounted on one or both sides of the modules main board and/or a daughterboard or the like.

Figure 16:
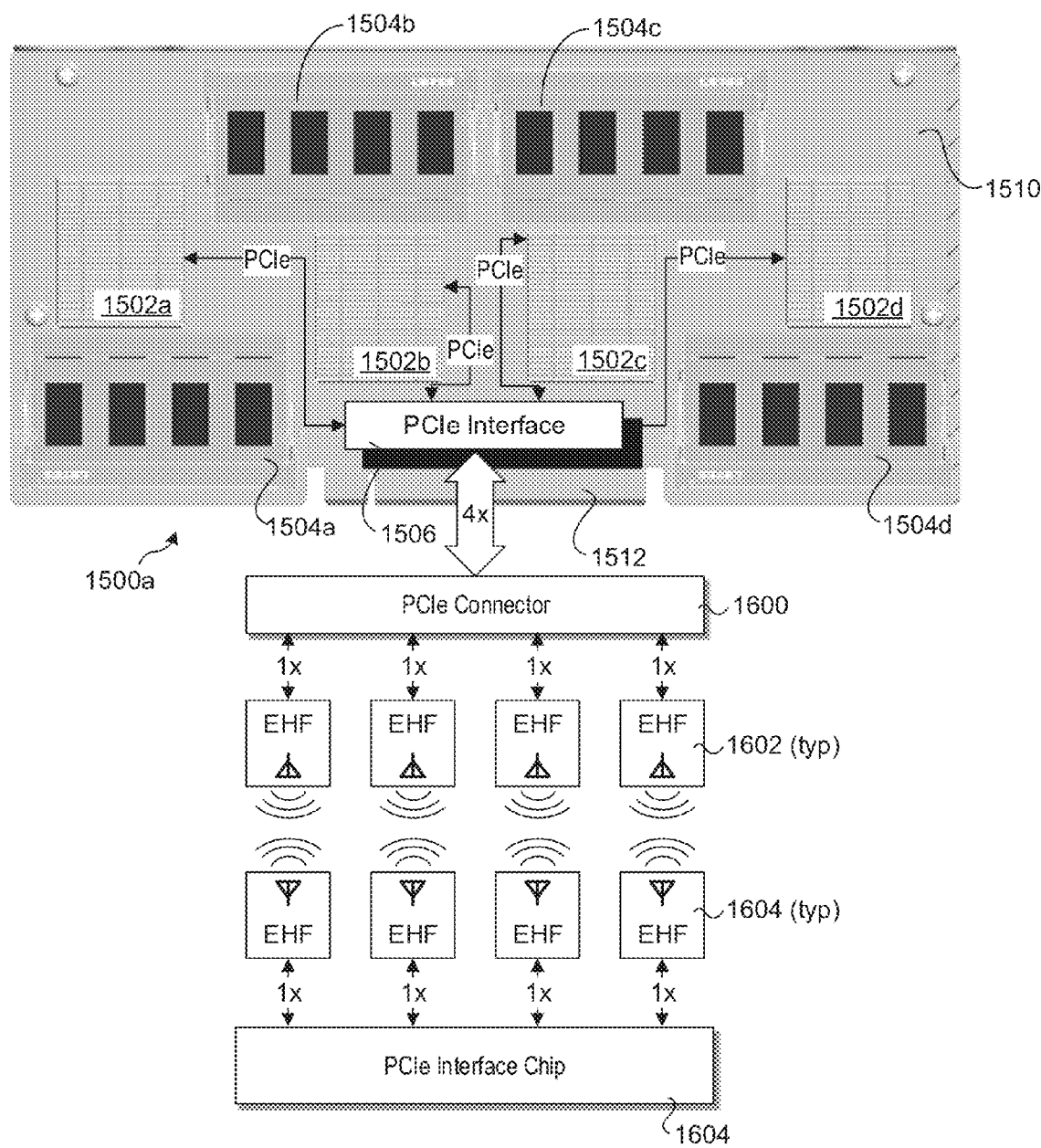
FIG. 16 is a schematic diagram illustrating a technique for combining multiple millimeter-wave wireless links in parallel to increase link bandwidth, according to one embodiment.

FIG. 16 illustrates an example of combining multiple individual millimeter-wave EHF links in parallel to support increased transfer rates across communication interfaces. In the illustrated embodiment, a server module 1500a includes a four lane (4x) PCIe interface 1506, and is coupled to a PCIe connector 1600 supporting four (or more) PCIe lanes. Pins corresponding to respective PCIe differential signal pairs are coupled to the differential TX input pins on each of a first set of EHF transceiver chips 1602, which are wirelessly linked in communication with EHF transceiver chips 1604 on a pairwise basis. In turn, the differential RX output pins on EHF transceiver chips 1604 are coupled to differential signal pair I/O pins on a PCIe interface chip 1606. In general, the technique illustrated in FIG. 16 may be used to support an nx PCIe link wherein n is an integer number of lanes greater than one. For example, standard PCIe multi-lane links may be implemented, such as 2x, 4x, 8x, 16x, etc. PCIe links.

Rack Level Pre-Installed Interconnect for Enabling Cableless Server/Storage/Networking deployment According to further aspects of the disclosure, EHF transceiver chips may be combined with pre-configured and/or installed waveguides made of plastic or similar material to facilitate implementation of rack level pre-installed interconnects that replace conventional cabling. This provides both a cost savings from both a materials and labor consideration. It further reduces or eliminates cabling errors, and facilitates tighter rack spacing.

During experimentation with the EHF transceiver chips, the inventors discovered that the millimeter-wave RF signals transmitted from a chip could be coupled to one end of a plastic tie-wrap and transmitted out the other end if the ends were cut-off cleanly. Moreover, the plastic tie-wraps could be bent with minimal attenuation of the RF signals, thus functioning like an optical waveguide at millimeter-wave frequencies.

Extending this concept further, it was realized that server racks could be "pre-wired" such that when a server chassis was installed in a rack slot it could be automatically connected to components in other rack slots via pre-defined connection point in the rack comprising ends of plastic "cable" waveguides, also referred to herein as simply plastic waveguides. Optionally, dielectric "manifolds" may be coupled to or integrated in the plastic waveguides to further facilitate coupling of millimeter-wave RF signals between the EHF transceiver chips and the plastic waveguide connection points.

Figure 3E:
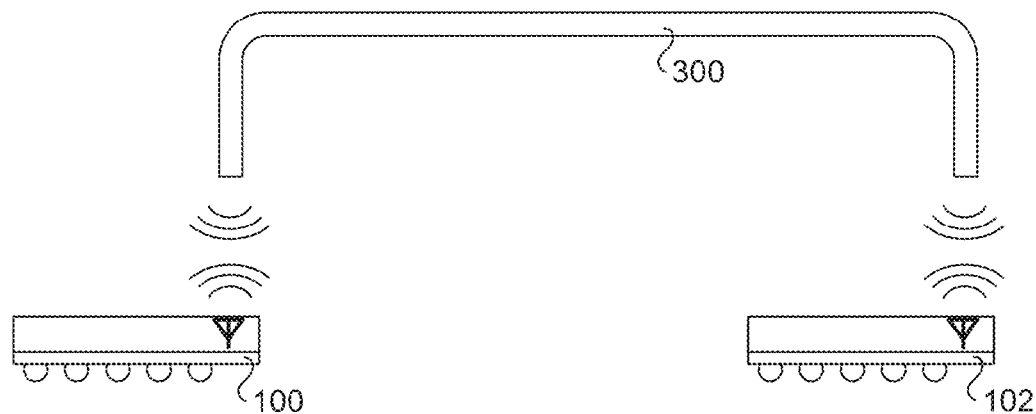

Various exemplary configurations illustrating transfer of millimeter-wave RF signals between pairs of EHF transceiver chips 100 and 102 using plastic waveguides are shown in FIGS. 3e-3h. In FIG. 3e, a pair of EHF transceiver chips 100 and 102 have a similar horizontal configuration and a plastic waveguide 300 has an elongated "U"-shape. In this example, EFT transceiver chips 100 and 102 are substantially in the same plane and the "legs" of plastic waveguide 300 are substantially equal; however, it will be recognized that EHF transceiver chips having similar orientations may be in different planes, and a plastic waveguide's legs may have different lengths.

Figure 3F:
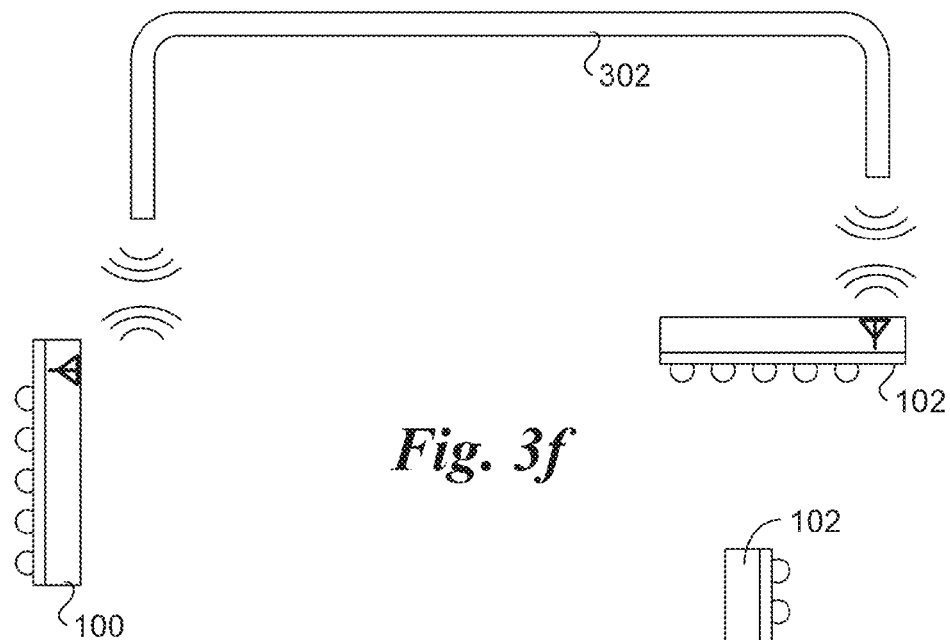
Figure 3G:
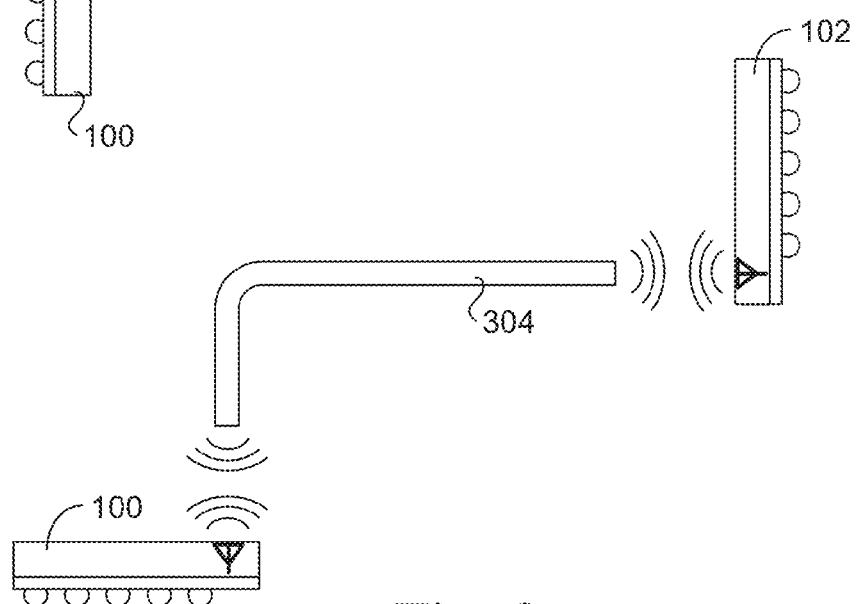

FIG. 3f depicts a configuration under which millimeter-wave RF signals for EHF transceiver chips 100 and 102 differ by 90 degrees and are coupled via an elongated U-shaped plastic waveguide 302 having legs of different lengths. Similarly, the EHF transceiver chips 100 and 102 in FIG. 3g differ by 90 degrees, and have their millimeter-wave RF signals coupled via an L-shaped plastic waveguide 304. Another configuration employing an L-shaped plastic waveguide 306 coupling millimeter-wave signals between EHF transceiver chips 100 and 102 having the same orientation but in different planes is shown in FIG. 3h.

In addition to facilitating communication between pairs of EHF transceiver chips, plastic waveguide may be configured to facilitate communication between multiple EHF transceiver chips. For example, FIG. 3i depicts a configuration under which millimeter-wave RF transmitter signals for three EHF transceiver chips 100, 102, and 104 are couple via a plastic waveguide 308 with three legs. More generally, this scheme may be extended to facilitate communication between n EHF transceiver chips using plastic waveguides with n legs. As before, the length of the legs may be the same or may differ.

Generally, the legs or other receiving members of a plastic waveguide may either extend into a chassis in which an EHF transceiver chip is disposed, or the millimeter-wave RF signals may pass through holes in a chassis baseplate, top-plate, or walls in a manner similar to shown in FIGS. 4a-4f, 5a-5f, 6 and 7. For instance, FIG. 3i-a shows a configuration under which millimeter-wave RF signals transmitted from and received by EHF transceiver chips 100, 102, and 104, pass through holes 310 in a sheet metal plate 312 and are coupled to the ends of legs 314, 316, and 318 of plastic waveguide 308. Meanwhile, FIG. 3i-b illustrates a configuration under which legs 314, 316, and 318 of plastic waveguide 308 extend through holes 310 in sheet metal plate 312.

Figure 17A:
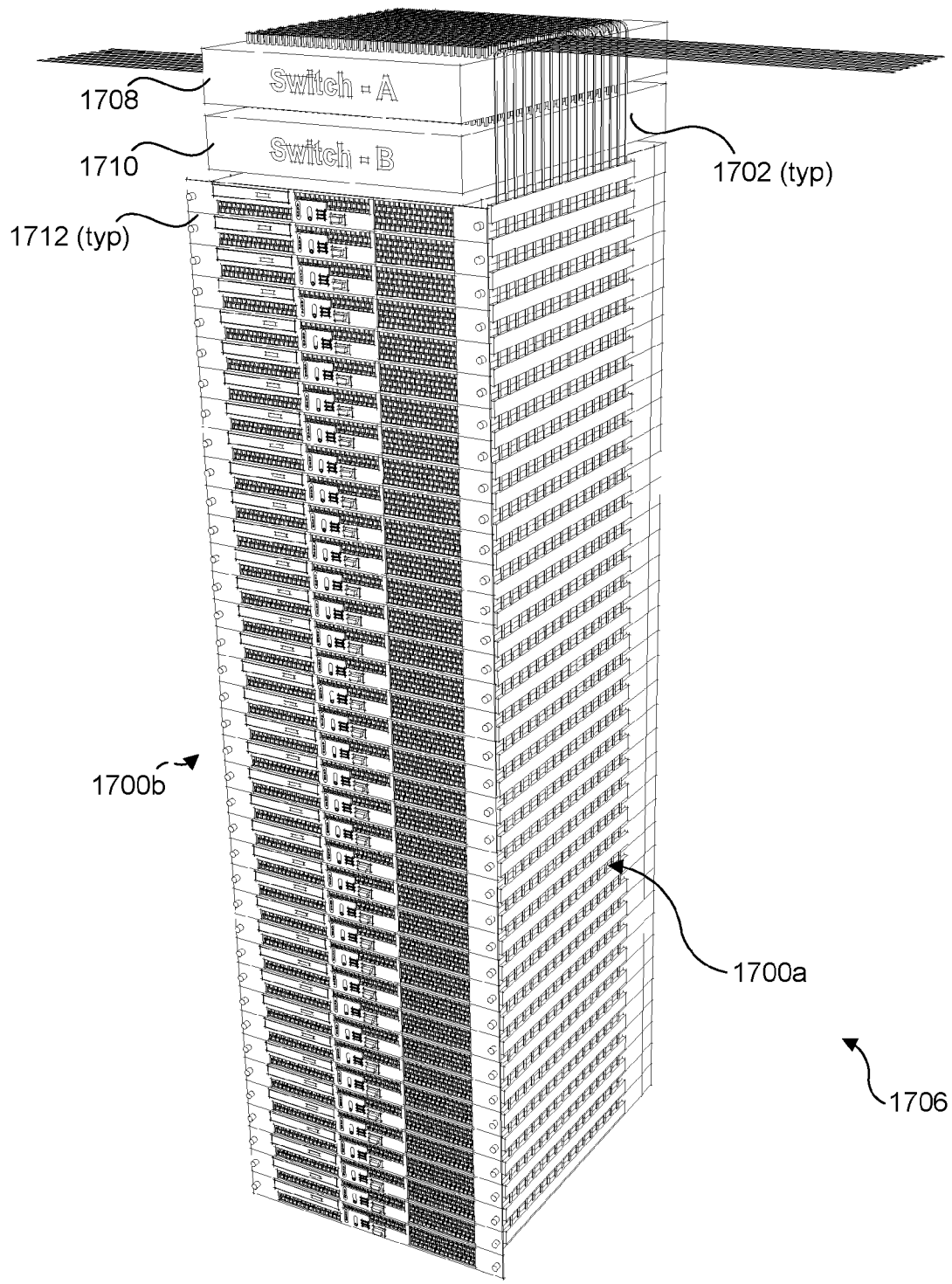
FIG. 17a shows a server rack employing a rack level pre-installed interconnect employing a plurality of plastic cable waveguides that are operatively coupled to the rack and/or server and switch chassis and configured to coupled millimeter-wave RF signals between EHF transceiver chips in separate chassis.
Figure 17B:
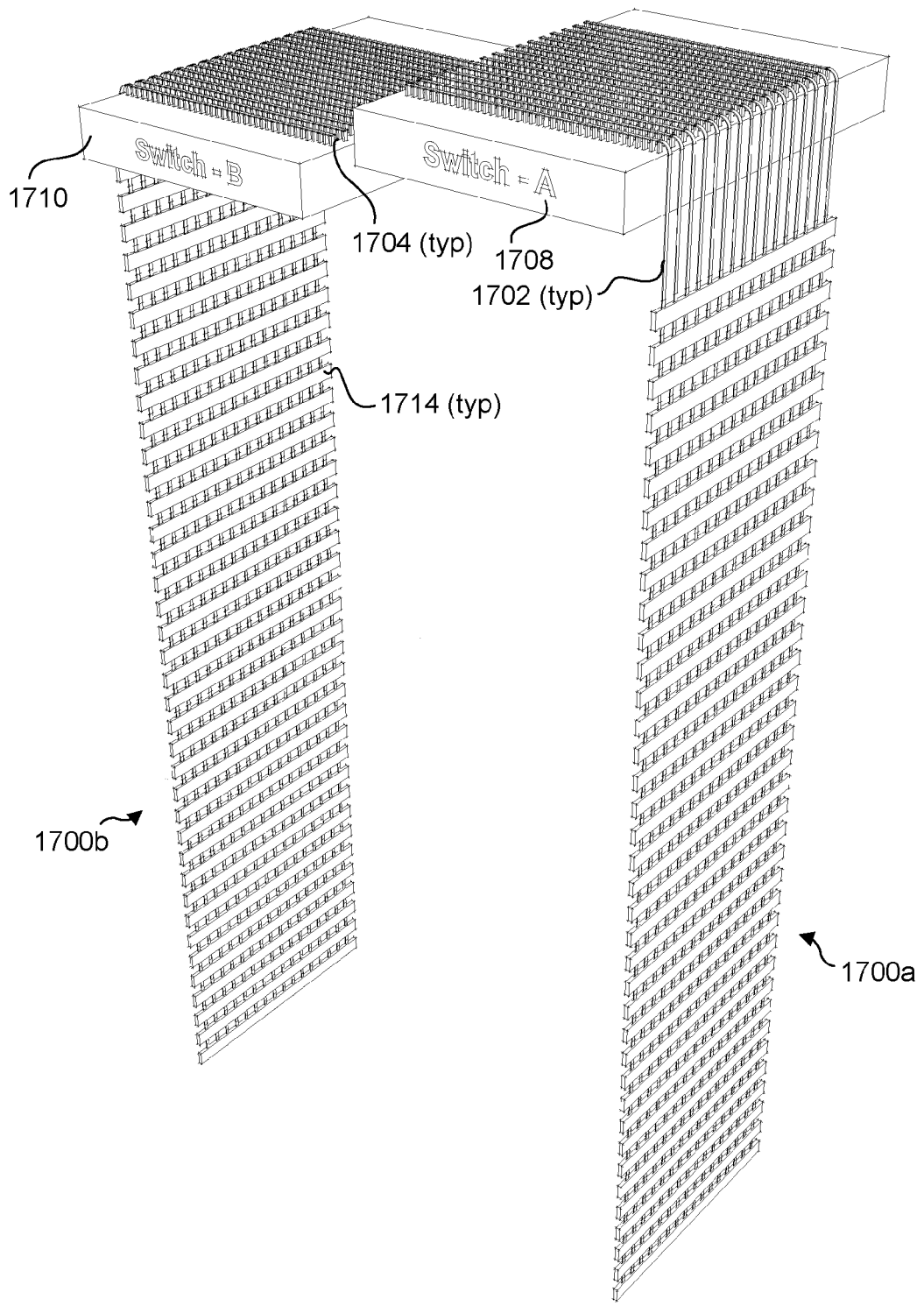
FIG. 17b shows further details of the rack level pre-installed interconnect structure, according to one embodiment.

FIGS. 17a-17g show various levels of details of an embodiment employing a pair of rack level pre-installed interconnects 1700a and 1700b. As shown in FIGS. 17a and 17b, pre-installed interconnects 1700a and 1700b include a plurality of plastic waveguides 1702 having a top portion including a plurality of legs 1704 and a vertical portion that extends down the sides of a rack 1706 having a pair of "top of rack" switches 1708 and 1710 (also shown as "Switch A" and "Switch B," respectively), and having a plurality of slots in which respective server chassis 1712 are installed. In the illustrated embodiment, the plastic waveguides are configured spaced at substantially fixed spacing that is maintained by a plurality of guides 1714. In one embodiment, guides 1714 are mounted to the sides of the rack (which are not shown so as not obscure details that would otherwise be hidden). In one embodiment, pre-installed interconnect 1700a and 1700b may be assembled as shown in FIG. 17b prior to installation to the rack. Optionally, guides 1714 may first be mounted to the rack, and then plastic waveguides 1702 may be installed in slots in guides 1714.

Figure 17C:
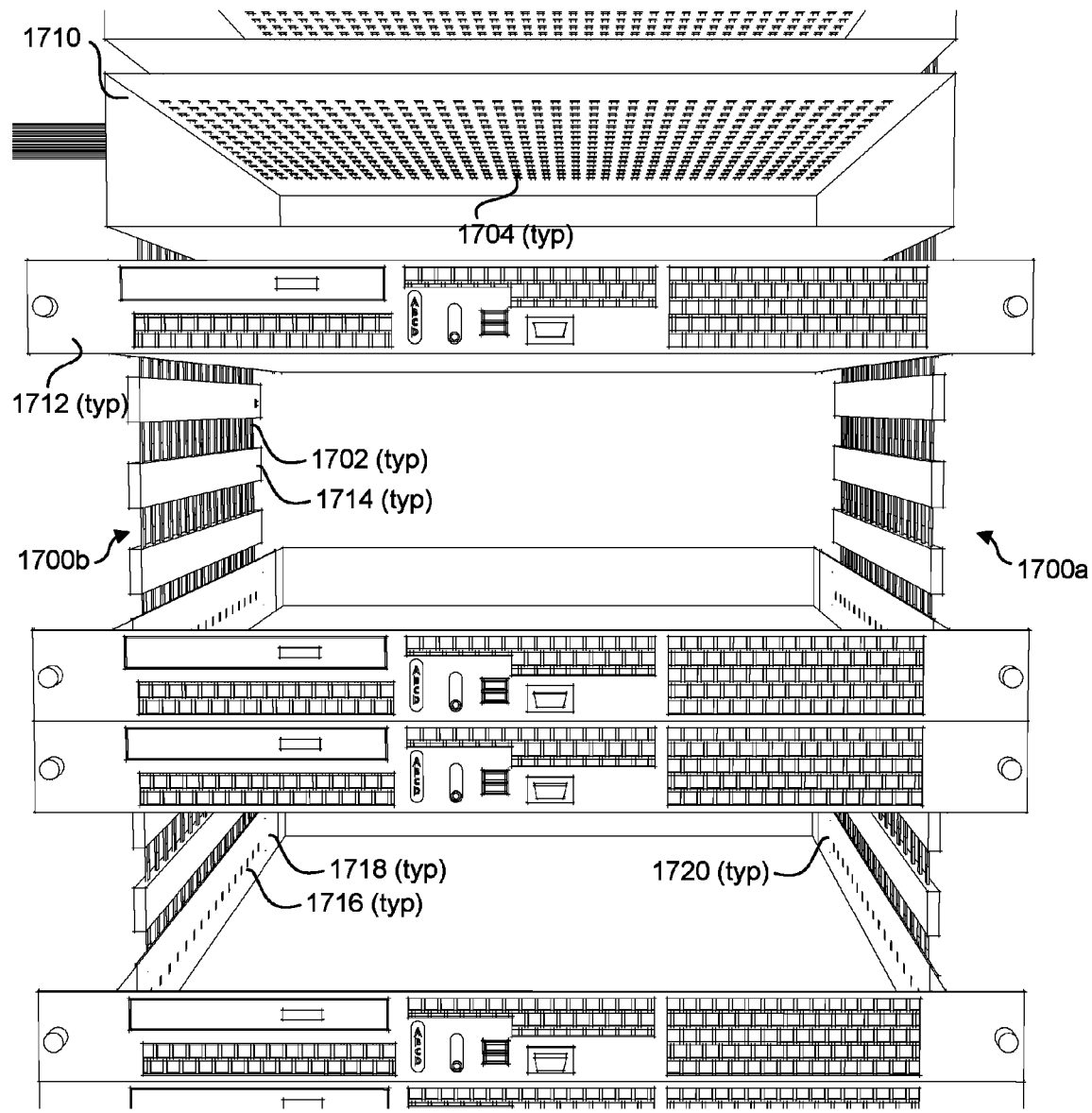
FIG. 17c shows a frontal perspective view of the rack with multiple server chassis removed to illustrate details of the provisions in the server chassis for facilitating signal coupling between EHF transceiver chips inside of the chassis and plastic cable waveguides on the outside of the chassis.
Figure 17D:
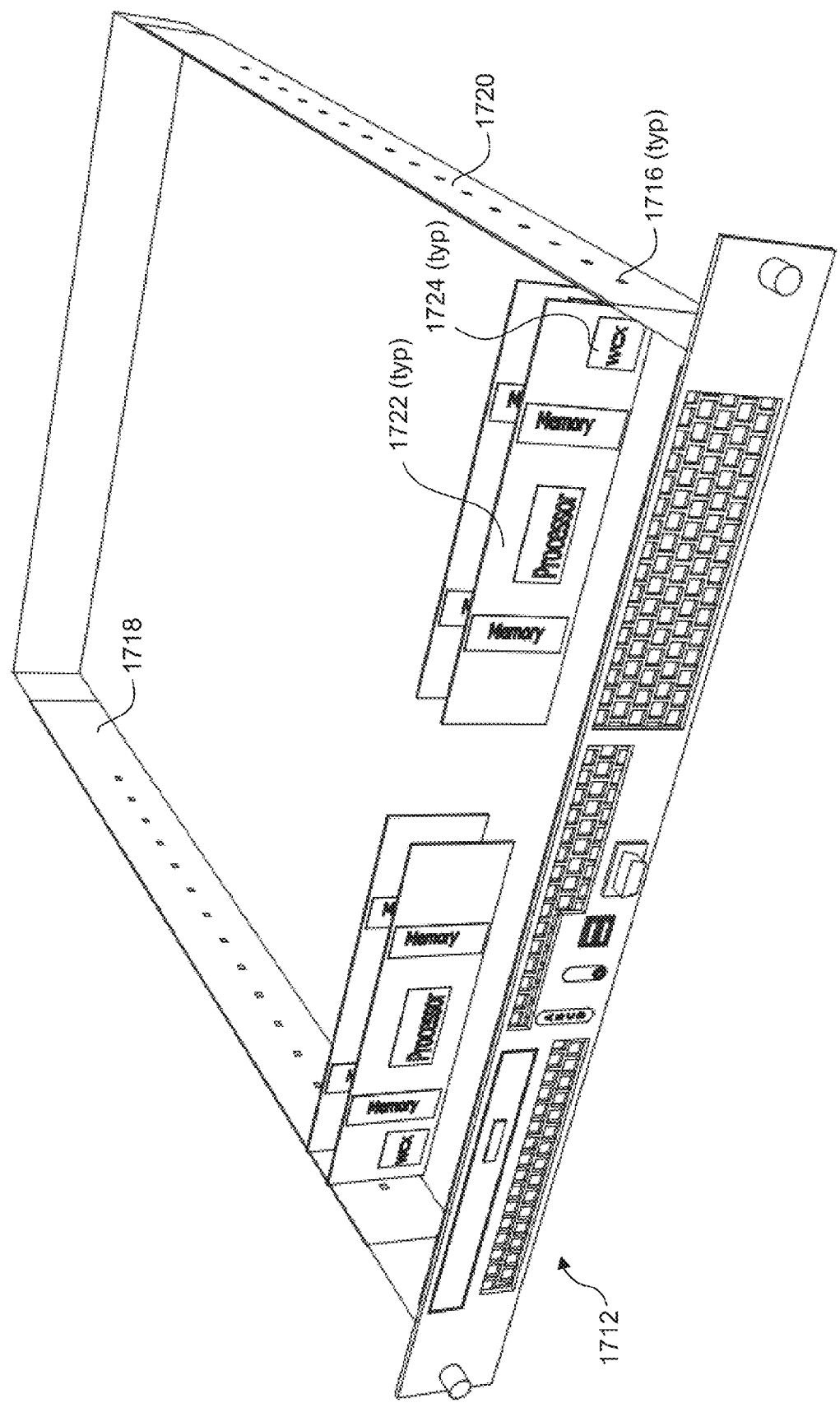
FIG. 17d shows an isometric perspective view of a server chassis configured to facilitate signal coupling between EHF transceiver chips inside of the chassis and plastic cable waveguides on the outside of the chassis.
Figure 17E:
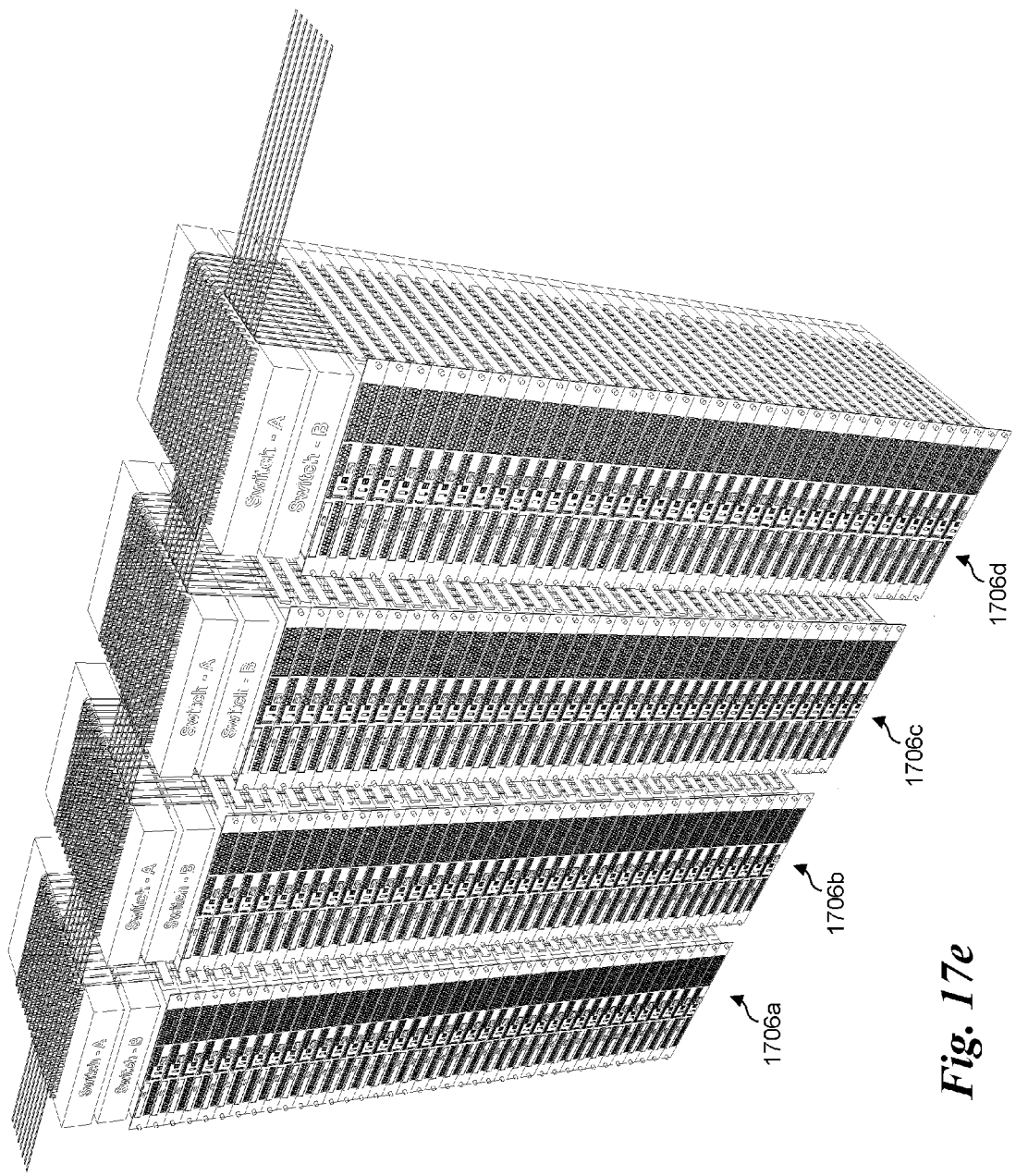
FIG. 17e shows four racks of servers with top of rack switches that are communicatively coupled through use of EHF transceiver chips and pre-installed interconnects comprising plastic cable waveguides.

FIGS. 17c-17e show further details of server chassis 1712, according to one embodiment. A plurality of holes 1716 are formed in side plates 1718 and 1720 of each server chassis 1712, wherein the pattern of the holes are configured to be proximate to respective plastic waveguides when the server chassis is installed in the rack. Meanwhile, an EHF transceiver chip is located proximate to one or more of holes 1716. Generally, an EHF transceiver chip may be mounted to a vertical board that is oriented parallel to side plates 1718 and 1720, or perpendicular to the side plates. This latter configuration is shown in the embodiment of FIG. 17d, wherein each of multiple microserver boards 1722 include an EHF transceiver chip 1724 that is located toward the edge of the board proximate to a respective hole 1716. This configuration enables server chassis to be installed and/or replaced without requiring any wiring to the server chassis.

Figure 17F:
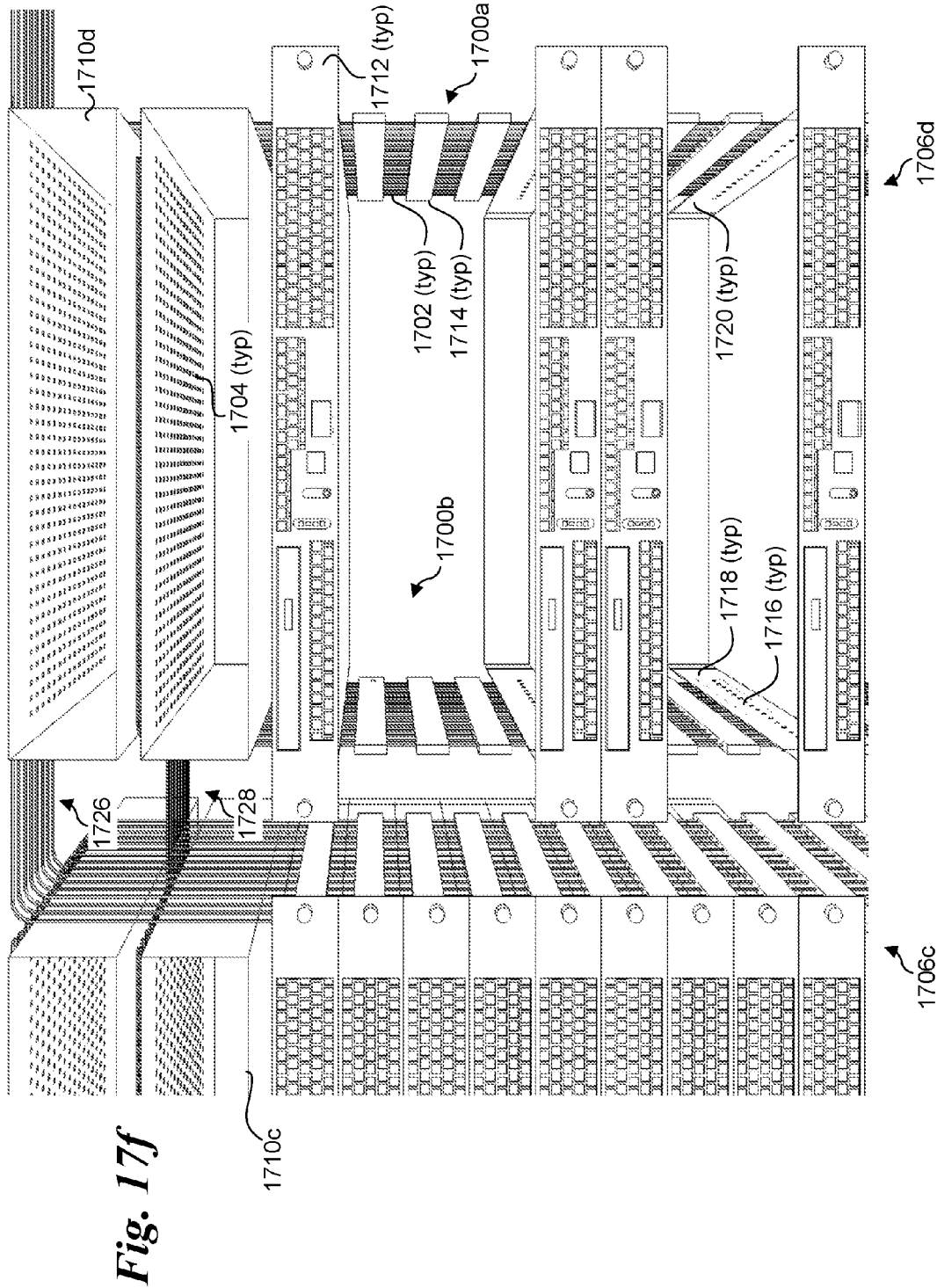
FIG. 17f shows a frontal perspective view illustrating the routing of plastic cable waveguides in a manner that facilitates coupling of millimeter-wave RF signals between servers in one rack and top of the rack switches in the adjacent rack.

As shown in FIGS. 17e and 17f, rack level pre-installed interconnects may be used to facilitate communication between components in multiple racks. FIG. 17e depicts four racks 1706a, 1706b, 1706c and 1706d, each with a pair of top of the rack switches 1708 and 1710. As shown in FIG. 17f, a portion of plastic waveguides 1726 that are communicatively coupled with server chassis 1712 along the right side of rack 1706c are routed to the top plate of top of rack switch 1710d of rack 1706d. Similarly, a portion of plastic waveguides 1728 that are communicatively coupled with server chassis 1712 along the left side of rack 1706d are routed to the top plate of top of rack switch 1710c of rack 1706c. Switching functionality provided by each of top of the rack switches 1708 and 1710 facilitate coupling of signals between server chassis 1712 in racks 1706c and 1706d. This scheme is similarly extended to facilitate communication between server chassis in each of racks 1706a, 1706b, 1706c, and 1706d.

FIGS. 18a and 18b show further details of a top of the rack switch 1708 or 1710, according to one embodiment. The top of the rack switch includes a circuit board 1800 in which a plurality of EHF transceiver chips 1802 are installed, each disposed opposite a respective hole 1804 formed in a top plate 1806 or a chassis 1808. A plurality of network connectors 1810 are mounted to the rear side of circuit board 1800, with various wire traces and via connecting the EHF transceiver chips to networks switch circuitry, as illustrated by a network switch chip 1812. Generally, the location of the EHF transceiver chips and holes will correspond to the location of legs 1704 the plastic cable waveguides of pre-installed interconnects 1700a and 1700b. Depending on the implementation, the end of legs 1704 may or may not extend through the holes 1804.

Figure 19A:
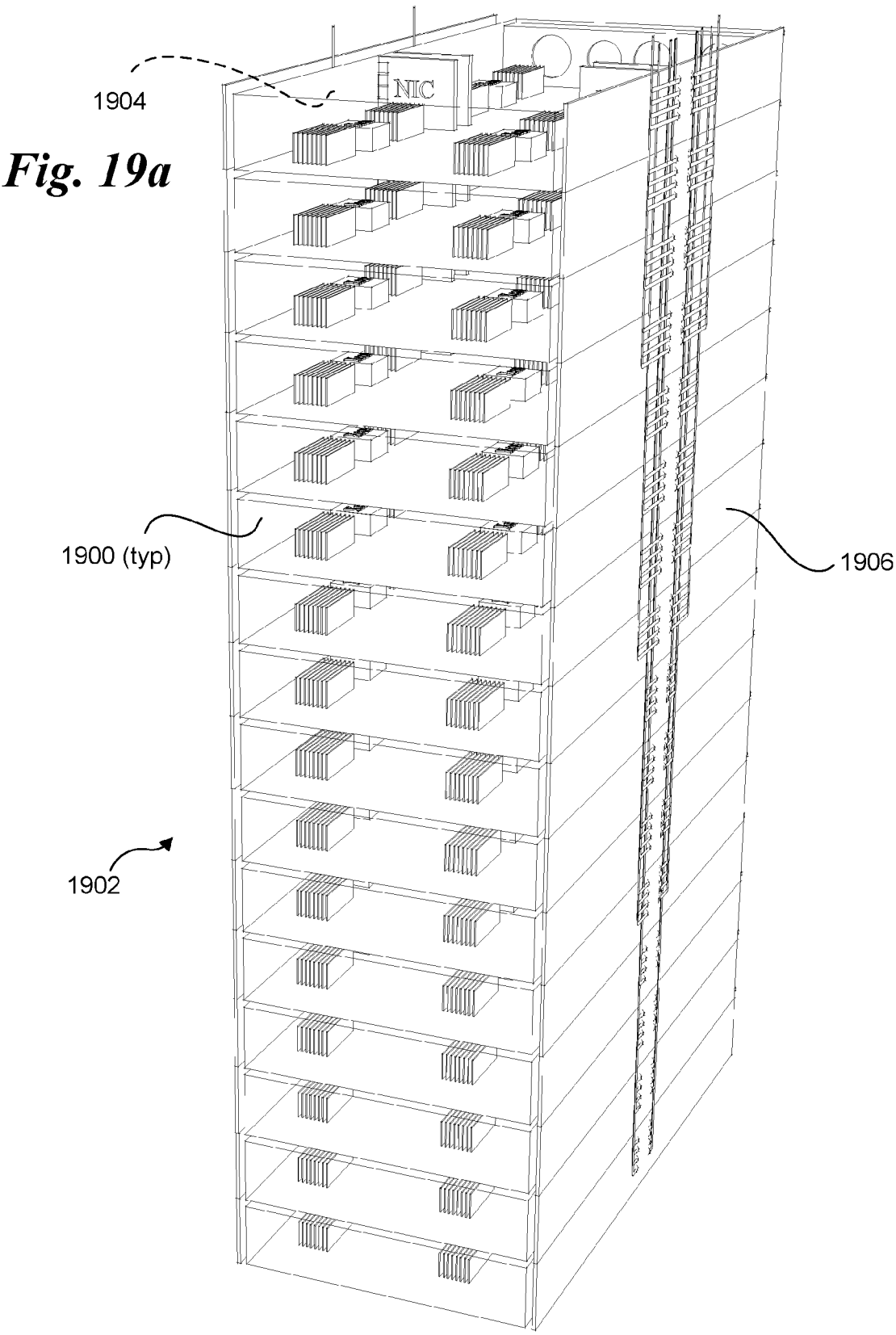
FIGS. 19a and 19b shows another embodiment of a rack of servers employing a pre-installed interconnect comprising a plurality of plastic cable waveguide configured to couple millimeter-wave RF signals between EHF transceiver chips in different chassis.
Figure 19B:
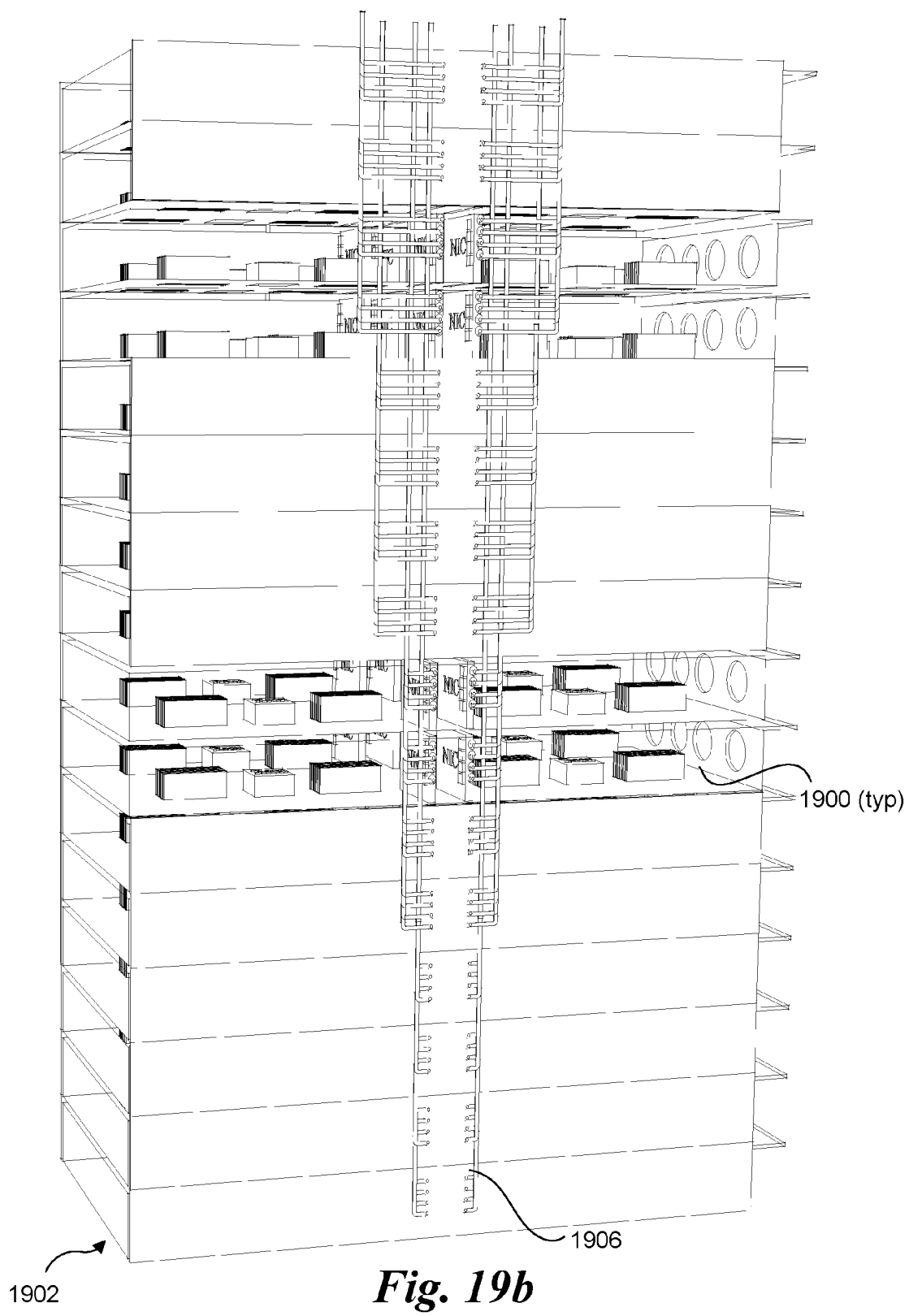

Another embodiment of a rack level pre-installed interconnect scheme is shown in FIGS. 19a-19e. As shown in FIG. 19a, a plurality of server chassis 1900 are installed in respective slots in a rack 1902, with sets of plastic waveguides 1904 and 1906 extending up and down the left and right sides of rack 1902. As shown in FIG. 19b, plastic waveguides 1906 are configured in an overlapping configuration under which there are a total of 32 plastic waveguides at the top of each side of the rack.

Figure 19C:
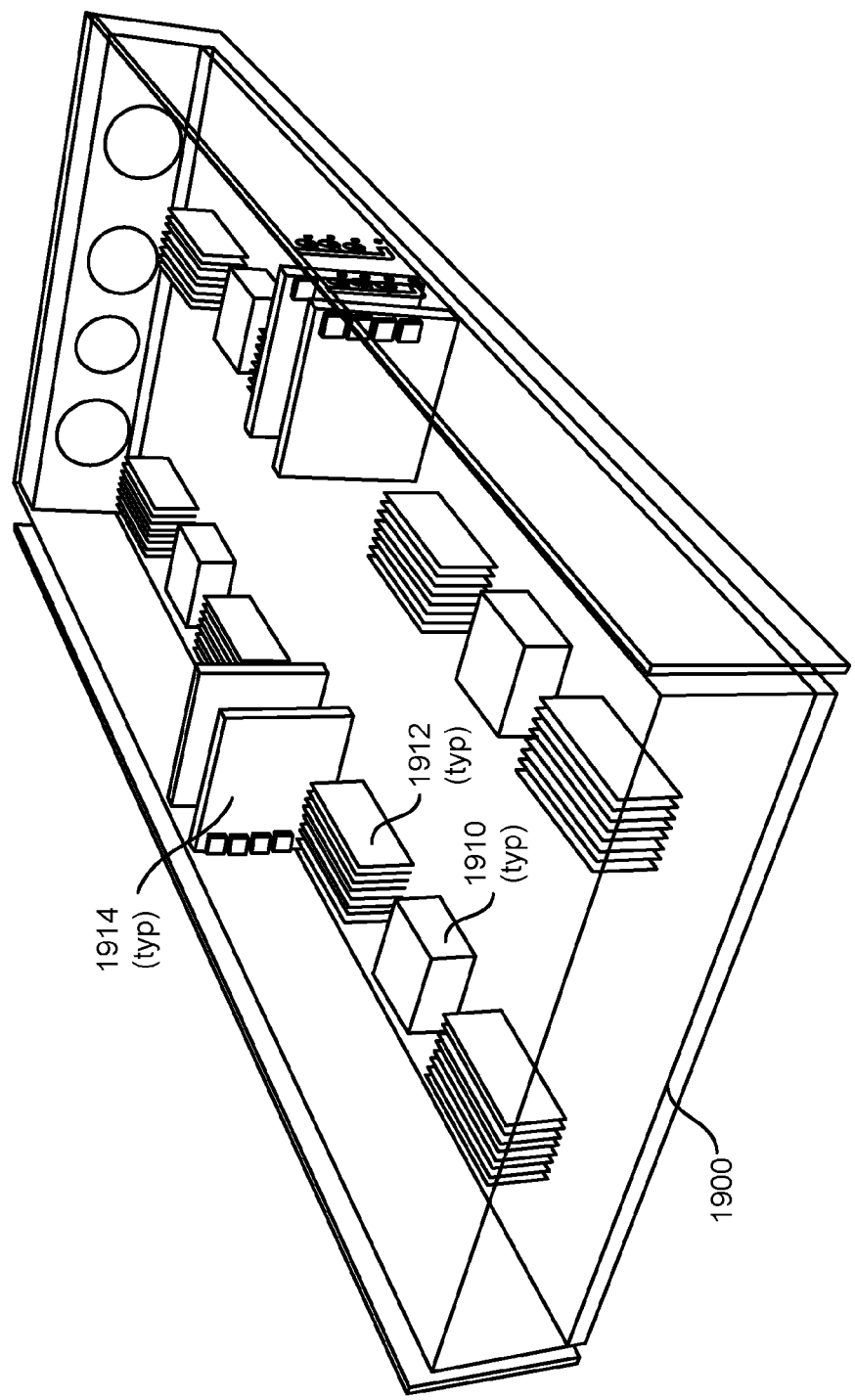
FIG. 19c shows an isometric frontal view of a server chassis configured to be used in the server rack of FIG. 19a, according to one embodiment.

FIG. 19c shows details of one embodiment of server chassis 1900, which includes four server modules each including a processor 1910, a plurality of memory modules 1912, and a network interface controller card (NIC) 1914. As further detailed in FIGS. 19d and 19e, each NIC 1914 includes a plurality of EHF transceiver chips 1916, 1918, 1920, and 1922. Each of these EHF transceiver chips is disposed proximate to a respective dielectric manifold 1924, 1926, 1928, and 1930, which in turn are respectively coupled to a plastic waveguide 1932, 1934, 1936, and 1938. As further shown, these plastic waveguides are generally flat in shape and are configured in a stacked manner. For convenience, the side plate of server chassis 1900 is not shown, and the side panel 1940 of rack 1902 is shown as being transparent. In an actual implementation, both of the server chassis side plates and the rack side panels would include holes having a pattern that matches the configuration of the EHF transceiver chips and dielectric manifolds.

Figure 19D:
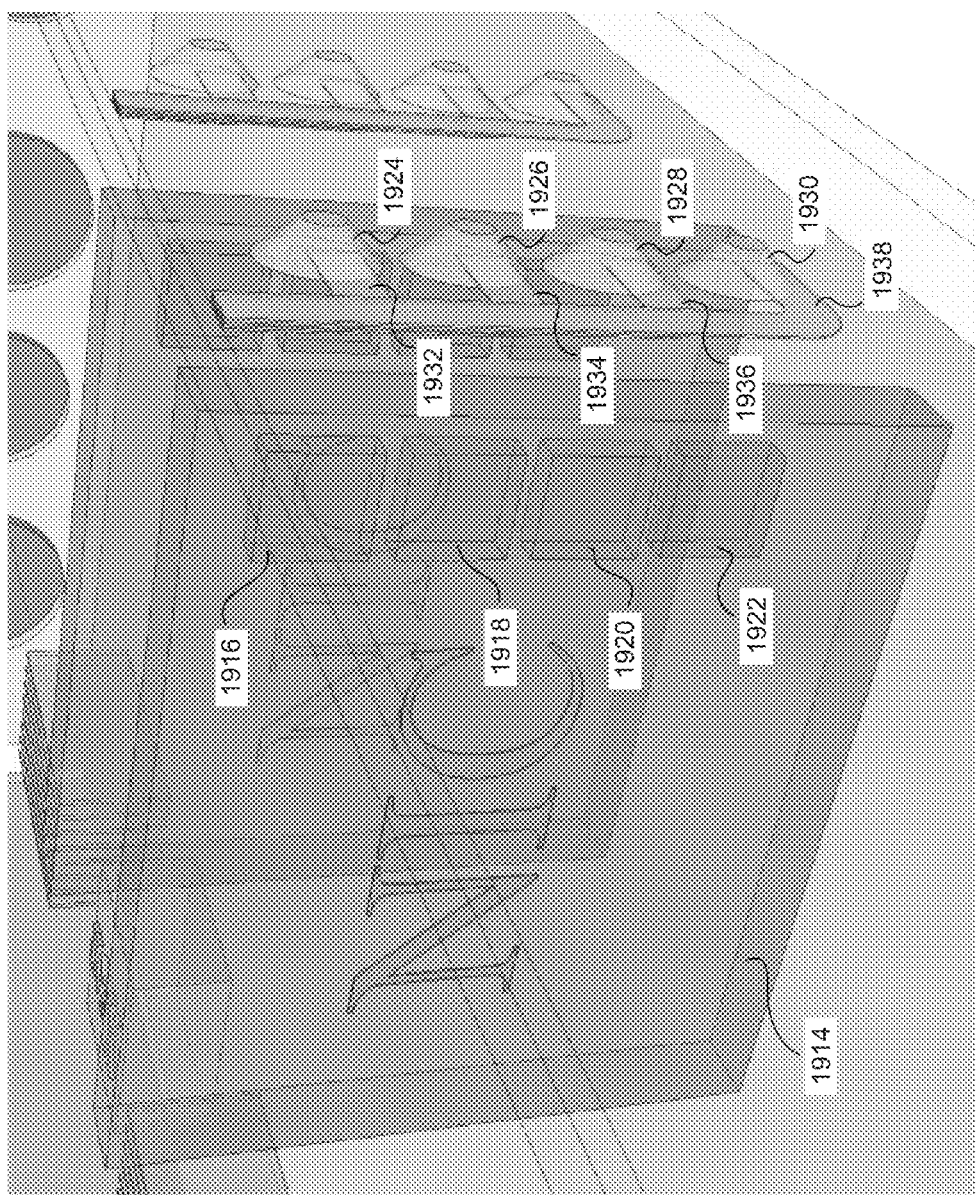
FIGS. 19d and 19e illustrate the location of EHF transceiver chips relative to dielectric manifolds used for couple millimeter-wave RF signals into and out of the plastic cable waveguides.
Figure 19E:
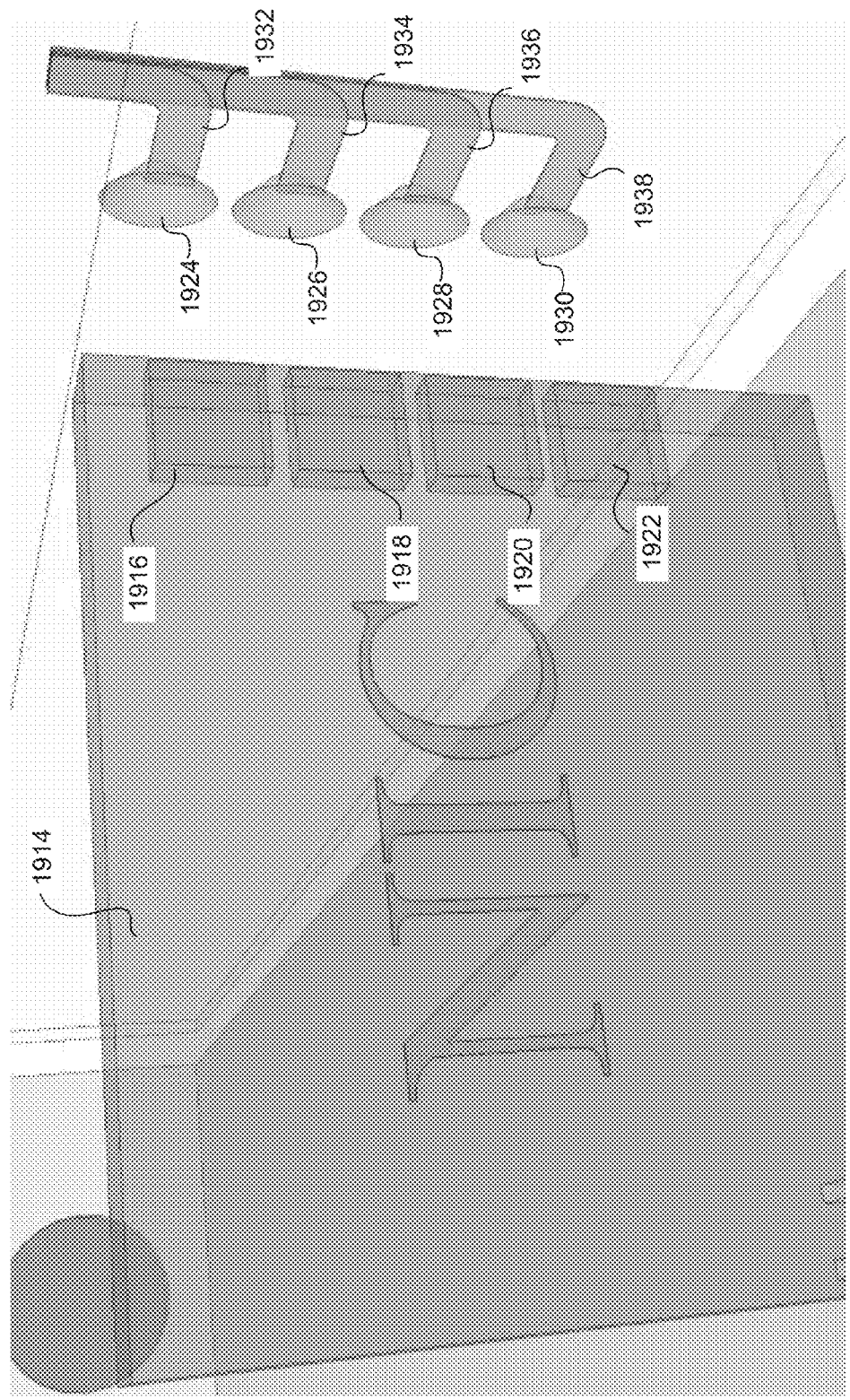

Generally, dielectric manifolds such as illustrated in FIGS. 19d and 19e may be used to facilitate coupling of millimeter-wave RF signals to and from plastic waveguides. The particular materials and configuration of the dielectric manifolds may generally depend on the particular RF frequency employed by the EHF transceiver chips. The plastic waveguides themselves have dielectric characteristics relative to the millimeter-wave RF signals, and thus in some embodiments the dielectric manifolds may be integrally formed with the plastic waveguides using a single plastic material. In other embodiments, the dielectric manifolds may be made of a different material than the plastic waveguide material.

In general, the plastic multiple waveguides may be configured in a variety of different cross-sections ranging from substantially flat to round. Additionally, the cross-section may also vary along its length. Also, multiple plastic waveguides may be combined in a bundle along a portion of their length, such as exemplified by the stacked configuration illustrated in FIGS. 19a-19e, as well as other bundled configurations. Preferably, areas of the waveguides that would be in contact in the bundle are separated by a conductive film or sheet, or otherwise means are provided for preventing millimeter-wave RF signals from being coupled between plastic waveguides.

Embodiments implementing the principles and teachings here provide several advantages over conventional approach. First, by facilitating millimeter-wave wireless links between EHF transceiver chips disposed in separate chassis, components that are directly or indirectly commutatively coupled to EHF transceiver chips are enabled to pass data to and receive data from components in other chassis without using a wire or optical cable connected between the chassis. This results in a cost savings, and also prevents wiring errors such as might result when connecting a large number of cables between chassis in a rack. Since the EHF transceiver chips are mounted to backplanes and other circuit boards, their implementation can be mass produced at a relatively low marginal cost (compared to similar components without the chips). Additionally, since no cable connections are required chassis can be easily removed for racks for maintenance such as replacement or upgrade of server blades or modules without having to disconnect and then reconnect the cables or otherwise need to employ extra cable lengths to allow for maintenance of chassis components.

In addition to using separate types of EHF communication techniques (e.g., EHF transceiver chip-to-EHF transceiver chip, or chip-to-waveguide-to chip) for a given chassis, the two techniques may be combined for coupling signals to and from the chassis. For example, a top of rack switch could couple signals to another top of rack switch in another rack using plastic cable waveguides, while coupling signals to a chassis below it using chip-to-chip signal coupling.

The following examples pertain to further embodiments. In an embodiment, a method is implemented that facilitates transfer of data between components in separate chassis using EHF transceiver chips and plastic cable waveguides. In accordance with the method, EHF transceiver chips are operatively coupled to first and second components in respect first and second chassis. A plastic cable waveguide is coupled to at least one of the first or second chassis, or a rack in which the first and second chassis are installed. The plastic cable waveguide includes first and second respective millimeter-wave RF coupling means located proximate to each of the first and second EHF transceiver chips. Communication between the first and second components is facilitated by transmitting a millimeter-wave RF signal from the first EHF transceiver chip to the second EHF transceiver chip via the plastic cable waveguide. Moreover, bi-direction communication between the components is supported by also transmitting millimeter-wave RF signals from the second EHF transceiver chip to the first EHF transceiver chip via the plastic cable waveguide.

In an embodiment of the method, the first and second chassis are installed in the same rack. In another embodiment of the method, the first and second chassis area installed in separate racks. In embodiments of the method the EHF transceiver chips use a 60 GHz carrier frequency and support a transfer bandwidth of up to 6 gigabits per second.

In an embodiment of the method, the millimeter-wave RF signal is transmitted via the plastic cable waveguide by transmitting a millimeter-wave RF signal from an antenna of the first EHF transceiver chip toward a first end of the plastic cable waveguide, which comprises a millimeter-wave radio frequency (RF) coupling means and is configured to couple the millimeter-wave RF signal into the plastic cable waveguide. In an embodiment, at least one of the first and second millimeter-wave RF coupling means comprises a dielectric manifold that is coupled to the plastic cable waveguide.

In another embodiment of the method the plastic cable waveguide includes a plurality of legs along a portion of its length, each comprising a respective millimeter-wave RF coupling means. A respective EHF transceiver chip is disposed proximate to each of the plurality of legs, and millimeter-wave RF signals are coupled into each of the plurality of legs transmitted from the respective EHF transceiver chip disposed proximate to that leg. Similarly, millimeter-wave RF signals are coupled out of each of the plurality of legs toward the respective EHF transceiver chip disposed proximate to that leg.

In accordance with further embodiments, apparatus are configured with means for performing the foregoing method operations. In an embodiment of an apparatus, the apparatus comprises a first chassis including a first component having a first EHF transceiver chip operatively coupled in communication therewith, and a second chassis including a second component having a second EHF transceiver chip operatively coupled in communication therewith. A first plastic waveguide is operatively coupled to at least one of the first and second chassis, having a first end proximate to the first EHF transceiver chip and a second end proximate to the second EHF transceiver chip. The first plastic waveguide is configured to facilitate a bi-directional millimeter-wave communication link between the first and second EFH transceiver chips when the first and second components are operating.

In an embodiment of the apparatus, the first EHF transceiver chip is located within a chassis frame of the first chassis, and the chassis frame includes a hole proximate to the first EHF transceiver chip that is configured to enable millimeter-wave RF signals transmitted from and received by the first EHF transceiver chip to be passed through the hole. In one embodiment the first component comprises a network interface component or network adaptor. In another embodiment, the first component comprises a server blade or server module to which the first EHF transceiver chip is coupled. In yet another embodiment, the first component comprises a backplane to which the first EHF transceiver chip is mounted. In embodiments of the method the EHF transceiver chips use a 60 GHz carrier frequency and support a transfer bandwidth of up to 6 gigabits per second.

In an embodiment of another apparatus, a chassis frame includes a metal top plate in which a plurality of holes are formed, and a backplane, mounted to the chassis frame proximate to the metal top plate, having a plurality of EHF transceiver chips mounted thereto, wherein the plurality of EHF transceiver chips are aligned with the plurality of holes formed in the metal top plate. The apparatus further includes at least one plastic waveguide having a plurality of legs, each leg disposed proximate to a respective EHF transceiver chip. The components are configured such that upon operation of the apparatus, millimeter-wave RF signals transmitted from each EHF transceiver chip is coupled into the plastic waveguide via the leg that is disposed proximate to the EHF transceiver chip.

In one embodiment, the backplane further comprises switching circuitry that is communicatively coupled to the plurality of EHF transceiver chips and a plurality of network connectors commutatively coupled to the switching circuitry. In one exemplary use of this embodiment, the apparatus is implemented as a top of the rack switch. In an embodiment, at least one of the plurality of the legs extends through a respective hole in the metal top plate. In an embodiment, the plurality of EHF transceiver chips are configured in a plurality of rows, and the apparatus further comprises a respective plastic waveguide having a plurality of legs for each row, wherein each leg of the respective plastic waveguide is disposed proximate to a respective EHF transceiver chip in the row.

In another embodiment of an apparatus, a plurality of plastic cable waveguides are coupled to a plurality of guides, and each of the guides configured to be mounted to at least one of a server rack or a member coupled to the server rack. Each plastic cable waveguide are configured for coupling millimeter-wave RF signals between the plastic cable waveguide and an EHF transceiver chip.

In an embodiment of the apparatus, the millimeter-wave RF signals employ a 60 GHz carrier frequency. In an embodiment of the apparatus, the EHF transceiver chips and plastic cable waveguides are configured to support communication bandwidths of up to 6 gigabits per second. In an aspect of some embodiment, multiple plastic cable waveguides are bundled together along a portion of their length. In one embodiment, the plastic cable waveguides are bundled in a stacked configuration.

In an embodiment, the apparatus further includes a server rack to which the plurality of guides are operatively coupled and having a plurality of server chassis slots configured to receive respective server chassis, where at least one server chassis slot includes at least one aperture through which millimeter-wave RF signals are enabled to pass. The installation is configured such that when a server chassis including a plurality of EHF transceiver chips is installed in a server chassis slot including at least one aperture a respective means for coupling millimeter-wave RF signals is disposed proximate to a respective EHF transceiver chip included with the server chassis. In accordance with an aspect of this embodiment, at least a portion of the means for coupling the millimeter-wave RF signals are configured in a pattern and the at least one aperture comprises a plurality of holes in a side panel of the server rack having a pattern that matches the pattern.

In accordance with another aspect of the apparatus, at least one of the plurality of plastic cable waveguides is configured to couple millimeter-wave RF signals between a first EHF transceiver chip disposed in the server rack to a second EFH transceiver chip disposed in another server rack. In an embodiment of the apparatus, at least one of the plurality of plastic cable waveguide includes a plurality of legs, wherein each leg is configured for coupling millimeter-wave RF signals into and out of that plastic cable waveguide. In an embodiment, dielectric manifolds are coupled to at least one plastic cable waveguide or integrally formed with at least one plastic cable waveguide.

In an embodiment of another method, a plurality of plastic cable waveguides are coupled to a server rack having a plurality of slots configured to receive a respective server chassis, at least a portion of the server chassis including at least one EHF transceiver chip, wherein when the at least a portion of the server chassis are installed in the server rack the plastic cable waveguides are configured to couple millimeter-wave RF signals between transceiver chips in the server chassis. In an embodiment, the plurality of plastic cable waveguides are pre-installed, and at least one server chassis is enabled to be installed and removed from a corresponding slot in the server rack without requiring physical connection or disconnection of any wire or optical cables. In an exemplary implementation, the plastic cable guides are configured to communicatively couple signals from server chassis in a rack to a top of the rack switch in the rack.

In an embodiment, the method further includes operatively coupling a second plurality of plastic cable waveguides to at least one of two adjacent server racks, at least one of the racks including server chassis and a switch chassis including a plurality of EHF transceiver chips, wherein the second plurality of waveguides are configured to couple millimeter-wave RF signals between transceiver chips in at least one of server chassis and switch chassis in separate racks. In an exemplary implementation each of the adjacent server racks includes a top of the rack switch including a plurality of EHF transceiver chips. In accordance with an embodiment of this implementation, a first plurality of plastic cable waveguides are employed to communicatively couple signals from server chassis in a first rack to a top of the rack switch in the first rack, while a second plurality of plastic cable waveguides are employed to communicatively couple signals between the top of the rack switch in the first rack to the top of the rack switch in the adjacent rack.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein, a list of items joined by the term "at least one of" can mean any combination of the listed terms. For example, the phrase "at least one of A, B or C" can mean A; B; C; A and B; A and C; B and C; or A, B and C.

As discussed above, various aspects of the embodiments herein may be facilitated by corresponding software and/or firmware components and applications, such as software running on a server or firmware executed by an embedded processor on a network element. Thus, embodiments of this invention may be used as or to support a software program, software modules, firmware, and/or distributed software executed upon some form of processing core (such as the CPU of a computer, one or more cores of a multi-core processor), a virtual machine running on a processor or core or otherwise implemented or realized upon or within a machine-readable medium. A machine-readable medium includes any mechanism for storing or transmitting information in a form readable by a machine (e.g., a computer). For example, a machine-readable medium may include a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method, comprising:
operatively coupling a first extremely high frequency (EHF) transceiver chip to a first component in a removable first chassis installed in a first slot of a data center rack configured to receive the first chassis;
operatively coupling a second EHF transceiver chip to a second component in a removable second chassis installed in a second slot of the data center rack or another data center rack configured to receive the second chassis;
coupling a plastic cable waveguide to at least one of the first chassis, the second chassis, and the data center rack, the plastic cable waveguide configured to couple millimeter-wave radio frequency (RF) signals output from the first EHF transceiver chip into the plastic cable waveguide and to communicatively couple the millimeter-wave RF signals to the second EHF transceiver chip, the plastic cable waveguide not having a connector and not being physically coupled to either the first or second EHF transceiver chips or any component within the first and second chassis; and
facilitating communication between the first and second components by transmitting the millimeter-wave RF signals from the first EHF transceiver chip to the second EHF transceiver chip via the plastic cable waveguide.

2. The method of claim 1, wherein the first and second chassis are installed in the same data center rack.

3. The method of claim 1, wherein the first and second chassis are installed in separate data center racks.

4. The method of claim 1, wherein the first and second EHF transceiver chips use a 60 GHz carrier frequency.

5. The method of claim 1, wherein the communication between the first and second components has a bandwidth of 6 gigabits per second.

6. The method of claim 1, wherein the millimeter-wave RF signal are transmitted via the plastic cable waveguide by transmitting a millimeter-wave RF signals from an antenna of the first EHF transceiver chip toward a first end of the plastic cable waveguide, wherein the first end is configured to couple the millimeter-wave RF signals into the plastic cable waveguide.

7. The method of claim 1, wherein the plastic cable waveguide includes a dielectric manifold that is configured to couple the millimeter-wave RF signals between the plastic cable waveguide and one of the first and second EHF transceiver chips.

8. The method of claim 1, further comprising facilitating a bi-directional communication link between the first and second component EHF transceiver chips via the plastic cable waveguide.

9. The method of claim 1, further comprising operatively coupling a third EHF transceiver chip to the plastic cable waveguide, wherein the plastic cable waveguide includes a plurality of legs along a portion of a length thereof, the method further comprising:
the coupling millimeter-wave RF signals into each of the plurality of legs transmitted from the respective EHF transceiver chip disposed proximate to that leg; and
the coupling millimeter-wave RF signals out of each of the plurality of legs toward the respective EHF transceiver chip disposed proximate to that leg,
wherein the plurality of legs includes at least three legs.

10. An apparatus comprising:
a first chassis, configured to be installed in first slot in a data center rack, including a first component contained therein and having a first extremely high frequency (EHF) transceiver chip operatively coupled in communication with the first component;

a second chassis, configured to be installed in second slot in the data center rack, including a second component contained therein having a second EHF transceiver chip operatively coupled in communication therewith; and a first plastic waveguide, configured to be coupled to at least one of the first chassis, the second chassis, and the data center rack, having a first end proximate to the first EHF transceiver chip and a second end proximate to the second EHF transceiver chip when the first and second chassis are installed in the first and second slots of the data center rack, wherein the first plastic waveguide is configured to facilitate a bi-directional millimeter-wave communication link between the first and second EFH transceiver chips when the first and second components are operating, and wherein the first and second ends of the first plastic waveguide do not include connectors and are not physically coupled to any components within the first and second chassis.

11. The apparatus of claim 10, wherein the first chassis has a mechanical structure including a chassis frame, and wherein the first EHF transceiver chip is located within the chassis frame of the first chassis, and the chassis frame includes a hole proximate to the first EHF transceiver chip that is configured to enable millimeter-wave RF signals transmitted from and received by the first EHF transceiver chip to be passed through the hole.

12. The apparatus of claim 10, wherein the first component comprises a network interface component or network adaptor.

13. The apparatus of claim 10, wherein the first component comprises a server blade or server module to which the first EHF transceiver chip is coupled.

14. The apparatus of claim 10, wherein the first component comprises a backplane to which the first EHF transceiver chip is mounted.

15. The apparatus of claim 10, wherein the first and second EHF transceiver chips use a 60 GHz carrier frequency.

* * * * *